(12) United States Patent
Ogawa et al.

(10) Patent No.: US 7,565,947 B2
(45) Date of Patent: Jul. 28, 2009

(54) VEHICULAR STEERING SYSTEM

(75) Inventors: Kenji Ogawa, Tokyo (JP); Takayuki Kifuku, Tokyo (JP); Masayoshi Yamamoto, Tokyo (JP); Masafumi Okazaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 149 days.

(21) Appl. No.: 11/698,960

(22) Filed: Jan. 29, 2007

(65) Prior Publication Data

US 2008/0040001 A1 Feb. 14, 2008

(30) Foreign Application Priority Data

Aug. 10, 2006 (JP) .............................. 2006-218306

(51) Int. Cl.
*B62D 5/04* (2006.01)
(52) U.S. Cl. ........................................ 180/444; 701/41
(58) Field of Classification Search ................. 180/443, 180/444, 446; 701/41, 42
See application file for complete search history.

(56) References Cited

U.S. PATENT DOCUMENTS

| 4,996,657 | A | * | 2/1991 | Shiraishi et al. | ............ | 702/151 |
| 6,640,923 | B1 | * | 11/2003 | Dominke et al. | ............ | 180/446 |
| 6,837,824 | B2 | * | 1/2005 | Reimann et al. | ............ | 475/343 |
| 2005/0016791 | A1 | * | 1/2005 | Fukushima et al. | ......... | 180/446 |
| 2006/0011405 | A1 | * | 1/2006 | Bayer et al. | ................. | 180/421 |
| 2007/0235240 | A1 | * | 10/2007 | Lauer et al. | ................. | 180/204 |
| 2008/0035412 | A1 | * | 2/2008 | Kenez et al. | ................ | 180/444 |

FOREIGN PATENT DOCUMENTS

| DE | 101-60-716 | A1 | 6/2003 |
| DE | 10-2004-035-744 | A1 | 4/2005 |
| DE | 10-2005-016-514 | A1 | 10/2006 |
| JP | 01-222885 | A | 9/1989 |
| JP | 01-270627 | A | 10/1989 |
| JP | 11-194827 | A | 7/1999 |
| JP | 2000351383 | A | 12/2000 |
| JP | 2002-310816 | A | 10/2002 |
| JP | 2003-337006 | A | 11/2003 |
| JP | 3518590 | B2 | 2/2004 |
| JP | 2005-231400 | A | 9/2005 |
| JP | 2005-350036 | A | 12/2005 |
| JP | 2006-010336 | A | 1/2006 |
| JP | 2006-159991 | A | 6/2006 |

\* cited by examiner

*Primary Examiner*—Paul N Dickson
*Assistant Examiner*—Tashiana Adams
(74) *Attorney, Agent, or Firm*—Sughrue Mion, PLLC

(57) ABSTRACT

A vehicular steering system can suppress steering of steerable road wheels in a direction not intended by a driver. A steering mechanism steers the steerable road wheels in accordance with a steering wheel and an auxiliary steering angle superposition mechanism. A calculation section calculates a target auxiliary steering angle corresponding to a steering wheel angle of the steering wheel. A detection section accurately detects the auxiliary steering angle based on detection signals of a rotation angle sensor that detects a rotation angle of a rotational member. A driving section controls the auxiliary steering angle superposition mechanism so as to make the auxiliary steering angle coincide with the target auxiliary steering angle. An auxiliary steering angle detection abnormality monitoring section detects abnormality of the auxiliary steering angle detection section. The auxiliary steering angle detection section includes a counting section that counts the number of revolutions per minute of the rotational member.

9 Claims, 14 Drawing Sheets

VEHICULAR STEERING SYSTEM

BACKGROUND OF THE INVENTION

1. Field of the Invention

The present invention relates to a vehicular steering system having a steering mechanism for steering the steerable road wheels of a vehicle in accordance with a value that is obtained by mechanically adding an auxiliary steering angle, which can be electrically controlled by an auxiliary steering angle superposition mechanism, to the steering wheel angle of a steering wheel steered by a driver. In particular, the invention relates to novel technical improvements for performing steering (intervention steering) to correct the steering operation of the steering wheel by the driver, and at the same time changing a transmission characteristic between the steering angle of the steering wheel operated by the driver and the steered angle of the steerable road wheels.

2. Description of the Related Art

Conventionally, there has been well known a vehicular steering system in which an auxiliary steering angle superposition mechanism and a steering mechanism are interposed between a steering wheel and steerable road wheels of a vehicle, so that the steerable road wheels are steered by mechanically superposing an amount of auxiliary steering by an electric motor in the auxiliary steering angle superposition mechanism on an amount of steering of the steering wheel operated by a driver. A planetary gear mechanism, a differential gear mechanism, a harmonic drive or the like is used as the auxiliary steering angle superposition mechanism.

In such a kind of vehicular steering system, there has also been proposed a technique that changes a transmission characteristic of the steered angle of the steerable road wheels with respect to the steering angle of the steering wheel (steering wheel angle) by the driver in accordance with the traveling condition of the vehicle (see, for example, a first patent document: Japanese patent No. 3518590).

In the conventional apparatus of the above-mentioned first patent document, the transmission characteristic between a steering wheel angle $\theta h$ (steering angle of the steering wheel operated by the driver) and the steered angle of the steerable road wheels is determined based on the traveling condition of the vehicle such as the vehicle speed, the steering speed of the steering wheel, etc., and a target steered angle $\theta pref$ is also determined based on the steering wheel angle $\theta h$ and the transmission characteristic.

In addition, a target auxiliary steering angle $\theta sref$ is determined based on a characteristic that is decided from the target steered angle $\theta pref$ and the mechanical construction of the auxiliary steering angle superposition mechanism.

For example, in case where the auxiliary steering angle superposition mechanism is controlled to be driven based on the target steered angle $\theta pref$, a sensor for detecting the steered angle $\theta p$ of the vehicle is used so that the auxiliary steering angle $\theta s$ of the auxiliary steering angle superposition mechanism is controlled to be driven so as to satisfy the following expression (1).

$$\theta pref - \theta p = 0 \tag{1}$$

Further, in case where the auxiliary steering angle superposition mechanism is controlled to be driven based on the target auxiliary steering angle $\theta sref$, a sensor for detecting the auxiliary steering angle $\theta s$ is used so that the auxiliary steering angle $\theta s$ of the auxiliary steering angle superposition mechanism is controlled to be driven so as to satisfy the following expression (2)

$$\theta sref - \theta s = 0 \tag{2}$$

For example, a rotary encoder or the like is used as a sensor for detecting the steered angle $\theta p$ or the auxiliary steering angle $\theta s$ of the vehicle, as shown in the above-mentioned first patent document.

The rotary encoder outputs two-phase pulse signals comprising a combination of "0" and "1", so the individual steered angle and auxiliary steering angle can be obtained by counting these pulse signals.

However, when the pulse signals become unable to be obtained due to a break or disconnection of either of signal lines for the two-phase pulses, failure of the rotary encoder, etc., normal counting of the pulse signals becomes impossible in spite of an actual change in the steered angle $\theta p$, so the detected value of the steered angle $\theta p$ or the auxiliary steering angle $\theta s$ does not change.

Thus, in case of using the steered angle $\theta p$ or the auxiliary steering angle $\theta s$ that does not change due to the failure, it will become impossible to make the expression (1) or expression (2) hold if the driving control of the auxiliary steering angle superposition mechanism is performed based on the expression (1) or expression (2).

Accordingly, the control of the auxiliary steering angle $\theta s$ to be superposed by the auxiliary steering angle superposition mechanism becomes abnormal, and as a result, there is a possibility that the steerable road wheels might be steered in a direction not intended by the driver.

Thus, in the above-mentioned first patent document, in order to detect the break or disconnection of the signal lines and the failure of the rotary encoder, the steered angle $\theta p$ is calculated from the steering wheel angle $\theta h$ and the auxiliary steering angle $\theta s$, as shown by the following expression (3).

$$\theta p = \theta h + \theta s \tag{3}$$

Whether the angle detection section is in failure is determined by comparing the steered angle $\theta p$ obtained from the expression (3) with a steered angle of the steerable road wheels that is estimated based on a difference between the speeds of right and left road wheels.

However, according to such a determination method, failure can not be detected until when the steering in the direction not intended by the driver proceeds.

It is necessary to separately or independently detect the failure of the rotary encoder at an early time in order to solve the above-mentioned problem, but the rotary encoder has all the combinations of two phase signals of "0" and "1", as stated above, so it is impossible to detect the failure of the rotary encoder from the correlation of the two-phase signals.

As described above, in the conventional vehicular steering system, particularly in the first patent document, in order to detect the break or disconnection of the signal lines or the failure of the rotary encoder, the steered angle $\theta p$ is calculated from the steering wheel angle $\theta h$ and the auxiliary steering angle $\theta s$, as shown by the expression (3), and compared with the steered angle estimated based on the difference between the right and left road wheel speeds, so there is a problem that failure can not be detected until when the steering in the direction not intended by the driver proceeds.

In addition, there is also another problem that even if the failure of the rotary encoder is intended to be separately or independently detected at an early time, detection signals of the rotary encoder include all the combinations of two-phase "0" and "1" signals and hence it is impossible to detect the failure of the rotary encoder from the correlation of the two-phase signals.

SUMMARY OF THE INVENTION

Accordingly, the present invention is intended to obviate the problems as referred to above, and has for its object to obtain a vehicular steering system which, even upon failure of a rotation angle sensor used for controlling the driving of an auxiliary steering angle superposition mechanism, is capable of detecting the failure of the rotation angle sensor at an early time thereby to suppress steerable road wheels of a vehicle from being steered to a direction not intended by a driver.

Bearing the above object in mind, a vehicular steering system according to the present invention has a steering mechanism for steering steerable road wheels of a vehicle in accordance with a steering wheel to be steered by a driver of the vehicle and an auxiliary steering angle superposition mechanism with an electrically controllable rotational member. The system includes: a steering wheel angle detection section that detects a steering angle of the steering wheel operated by the driver as a steering wheel angle; an auxiliary steering angle detection section that detects an auxiliary steering angle to be superposed by the auxiliary steering angle superposition mechanism; a vehicle travel state detection section that detects the traveling state of the vehicle; a transmission characteristic setting section that sets a transmission characteristic between the steering wheel angle and the steered angle of the steerable road wheels in accordance with the traveling state of the vehicle; a target auxiliary steering angle calculation section that calculates a target auxiliary steering angle to be superposed by the auxiliary steering angle superposition mechanism in accordance with the transmission characteristic; a driving control section that drives the auxiliary steering angle superposition mechanism so as to make the auxiliary steering angle detected by the auxiliary steering angle detection section coincide with the target auxiliary steering angle; and an auxiliary steering angle detection abnormality monitoring section that detects the presence or absence of abnormality of the auxiliary steering angle detection section. The auxiliary steering angle detection section includes: a rotation angle sensor that outputs $\sin \theta$ and $\cos \theta$ corresponding to a rotation angle of the rotational member as detection signals; a rotation angle calculation section that calculates the rotation angle of the rotational member based on the detection signals; a multi-revolution counting section that counts the number of revolutions per minute of the rotational member based on the rotation angle; and an auxiliary steering angle calculation section that calculates the auxiliary steering angle based on the rotation angle and the number of revolutions per minute. The auxiliary steering angle detection abnormality monitoring section detects the presence or absence of abnormality of the auxiliary steering angle detection section by monitoring the detection signals.

According to the present invention, a vehicular steering system includes an auxiliary steering angle detection section that detects an auxiliary steering angle to be superposed by an auxiliary steering angle superposition mechanism, and an auxiliary steering angle detection abnormality monitoring section that detects abnormality of the auxiliary steering angle detection section. The auxiliary steering angle detection section includes: a rotation angle sensor that outputs detection signals comprising $\sin \theta$ and $\cos \theta$ corresponding to the rotation angle $\theta$ of a rotational member that constitutes the auxiliary steering angle superposition mechanism; a rotation angle calculation section that calculates the rotation angle $\theta$ of the rotational member based on the detection signals of the rotation angle sensor; and a rotation measuring section that measures the number of revolutions per minute of the rotational member. The auxiliary steering angle detection abnormality monitoring section detects abnormality of the auxiliary steering angle detection section by monitoring the detection signals of the rotation angle sensor. As a result, the abnormality of the auxiliary steering angle detection section can be separately or independently detected at an early time, whereby it is possible to suppress the steerable road wheels of a vehicle from being steered to a direction not intended by a driver.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Hereinafter, preferred embodiments of the present invention will be described in detail while referring to accompany drawings.

Embodiment 1

Figure 1:
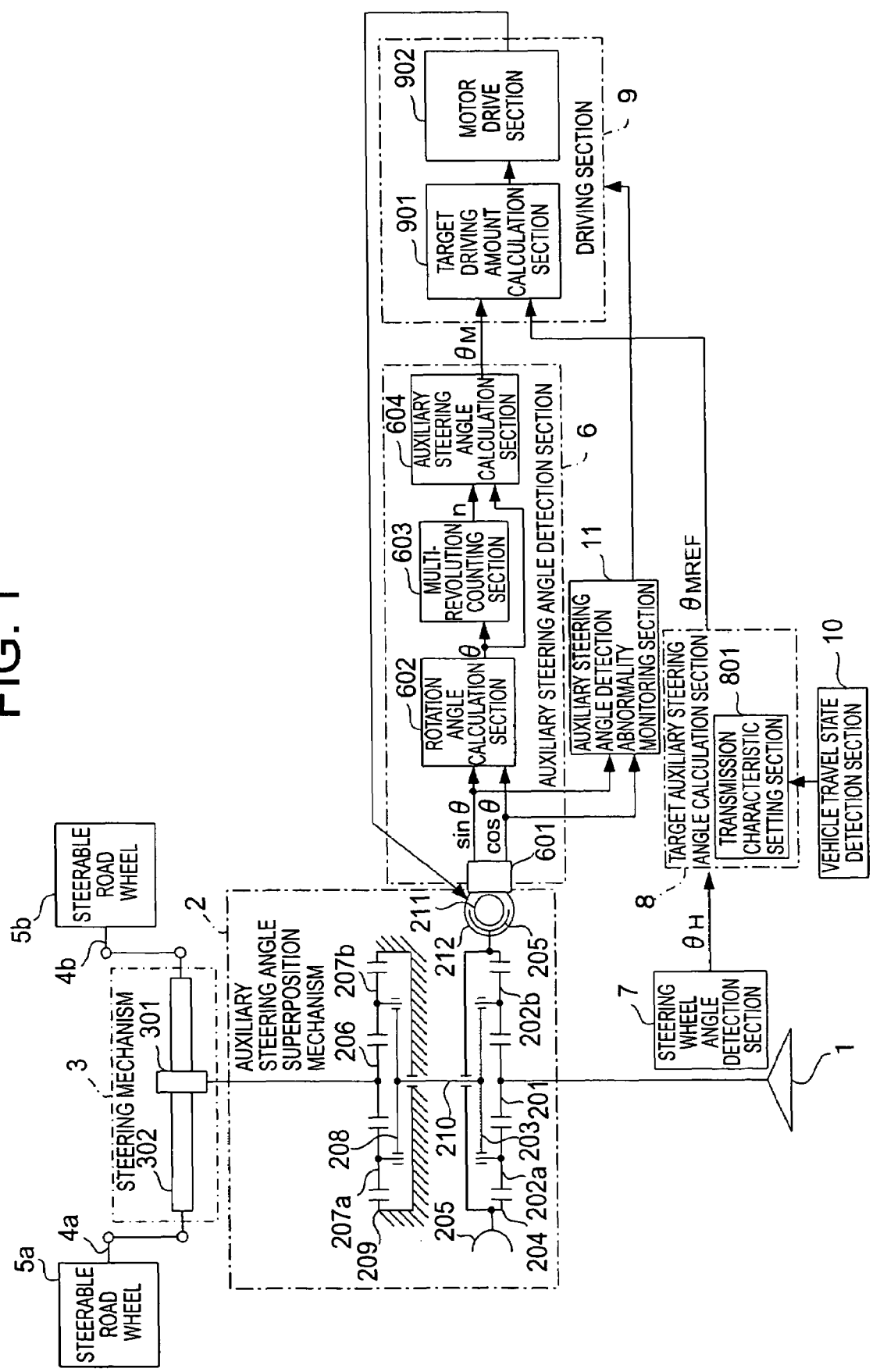
FIG. 1 is a block diagram showing the overall configuration of a vehicular sterling system according to a first embodiment of the present invention.

Referring to the drawings and first to FIG. 1, there is shown, in a block diagram, a vehicular steering system according to a first embodiment of the present invention. In FIG. 1, the vehicular steering system includes a steering wheel 1 that is steered by the driver of a vehicle, an auxiliary steering angle superposition mechanism 2 that is composed of two planetary gear mechanisms and an electrically controllable rotational member (to be described later), a steering mechanism 3 that steers steerable road wheels 5a, 5b of the vehicle according to the steering wheel 1 and the auxiliary steering angle superposition mechanism 2, and a pair of knuckle arms 4a, 4b that connect between the steering mechanism 3 and the steerable road wheels 5a, 5b, respectively.

In addition, the vehicular sterling system according to the first embodiment of the present invention further includes an auxiliary steering angle detection section 6 that detects an auxiliary steering angle $\theta_M$ to be superposed by the auxiliary steering angle superposition mechanism 2, a steering wheel angle detection section 7 that detects the steering angle of the steering wheel 1 operated by the driver as a steering wheel angle $\theta_H$, a target auxiliary steering angle calculation section 8 that calculates a target auxiliary steering angle $\theta_{MREF}$ to be superposed by the auxiliary steering angle superposition mechanism 2 in accordance with a transmission characteristic, a driving section 9 that drives the auxiliary steering angle superposition rudder mechanism 2 in such a manner that the auxiliary steering angle $\theta_M$ detected by the auxiliary steering angle detection section 6 coincides with the target auxiliary steering angle $\theta_{MREF}$, a vehicle travel state detection section 10 that detects the traveling state of said vehicle, and an auxiliary steering angle detection abnormality monitoring section 11 that detects the presence or absence of the abnormality of the auxiliary steering angle detection section 6.

The auxiliary steering angle superposition mechanism 2 is provided with a rotational member that is driven by the driving section 9, a first planetary gear mechanism 201 through 205 that is connected with the rotational member and the steering wheel 1, and a second planetary gear mechanism 206 through 209 that is interposed between the first planetary gear mechanism 201 through 205 and the steering mechanism 3. The rotational member of the auxiliary steering angle superposition mechanism 2 each comprises a worm gear 211, and an electric motor 212 that drives the worm gear 211.

In the case of FIG. 1, the auxiliary steering angle detection section 6 detects the auxiliary steering angle $\theta_M$ on the basis of the rotation angle of the electric motor 212 in the auxiliary steering angle superposition mechanism 2. Here, note that in the auxiliary steering angle superposition mechanism 2, the sum of the steering wheel angle $\theta_H$ and the auxiliary steering angle $\theta_M$ is, in principle, equal to a pinion angle $\theta_P$ (the rotation angle of the pinion gear 301 to be described later). In addition, the auxiliary steering angle is strictly a value that is obtained by multiplying the rotation angle of the electric motor 212 by $G_S$ (the speed ratio from the worm gear 211 to the pinion gear 301 to be described later). However, detecting the rotation angle of the electric motor 212 is substantially equal to detecting the auxiliary steering angle, so in the following, the rotation angle $\theta_M$ of the electric motor 212 is expediently handled as the auxiliary steering angle.

The first planetary gear mechanism in the auxiliary steering angle superposition mechanism 2 is composed of a sun gear 201 connected with the steering wheel 1, a pair of planetary gears 202a, 202b supported by a carrier 203, a ring gear 204, and a worm wheel 205 for rotating the ring gear 204. The second planetary gear mechanism connected with the first planetary gear mechanism is composed of a sun gear 206, a pair of planetary gears 207a, 207b supported by a carrier 208, and a fixed ring gear 209. The carrier 203 of the first planetary gear mechanism and the carrier 208 of the second planetary gear mechanism are connected with each other through a shaft 210.

The steering mechanism 3 is of a rack-and-pinion type, and is composed of a pinion gear 301 that is connected with the shaft 210, and a rack gear 302 that is in mesh with the pinion gear 301.

The rotation of the pinion gear 301 is converted into a linear motion of the rack gear 302, and the linear motion of the rack gear 302 is converted into a steered angle of the steerable road wheels 5a, 5b through the knuckle arms 4a, 4b.

The direction (steered angle $\theta_W$) of the steerable road wheels 5a, 5b is obtained by directly detecting the steered angle of the steerable road wheels 5a, 5b, or directly detecting the opinion angle $\theta_P$, or detecting the stroke of the rack gear 302.

Here, there is illustrated, as an example, the case where the steered angle $\theta_W$ is obtained by detecting the pinion angle $\theta_P$.

The auxiliary steering angle detection section 6 includes a rotation angle sensor 601 that outputs, as detection signals, sin θ and cos θ corresponding to the rotation angle θ of the electric motor 212 in the auxiliary steering angle superposition mechanism 2, a rotation angle calculation section 602 that calculates the rotation angle θ of the electric motor 212 based on the detection signals sin θ, cos θ, a multi-revolution counting section 603 that counts the number of revolutions per minute n of the electric motor 212 based on the rotation angle θ, and an auxiliary steering angle calculation section 604 that calculates the auxiliary steering angle $\theta_M$ based on the rotation angle θ and the number of revolutions per minute n.

The target auxiliary steering angle calculation section 8 includes a transmission characteristic setting section 801 that sets a transmission characteristic between the steering wheel angle $\theta_H$ and the steered angle $\theta_W$ of the steerable road wheels 5a, 5b in accordance with the traveling condition of the vehicle.

The auxiliary steering angle detection abnormality monitoring section 11 detects the presence or absence of abnormality of the auxiliary steering angle detection section 6 by monitoring the detection signals sin θ, cos θ, and stops the driving of the auxiliary steering angle superposition mechanism 2 by the driving section 9 when abnormality of the auxiliary steering angle detection section 6 is detected.

The driving section 9 includes a target driving amount calculation section 901 that calculates a target amount of driving (e.g., a target current) on the basis of a deviation between the detected auxiliary steering angle $\theta_M$ and the target auxiliary steering angle $\theta_{MREF}$, and a motor drive part 902 that drives the electric motor 212 in accordance with the target amount of driving.

In FIG. 1, the steering wheel angle detection section 7 detects the steering angle $\theta_H$ (the steering wheel angle) of the steering wheel 1 that is steered by the driver, and inputs it to the target auxiliary steering angle calculation section 8. The vehicle travel state detection section 10 detects the traveling condition of the vehicle, and inputs it to the target auxiliary steering angle calculation section 8. The transmission characteristic setting section 801 in the target auxiliary steering angle calculation section 8 sets the transmission characteristic of the steerable road wheels 5a, 5b to the steering wheel angle $\theta_H$ based on the traveling condition of the vehicle. The target auxiliary steering angle calculation section 8 calculates, based on the steering wheel angle $\theta_H$ and the transmission characteristic, a required auxiliary steering angle to be superposed by the auxiliary steering angle superposition mechanism 2 as the target auxiliary steering angle $\theta_{MREF}$. The driving section 9 drives the electric motor 212 in the auxiliary steering angle superposition mechanism 2 in such a manner that the auxiliary steering angle $\theta_M$ detected by the auxiliary steering angle detection section 6 coincides with the target auxiliary steering angle $\theta_{MREF}$ calculated by the target auxiliary steering angle calculation section 8.

The auxiliary steering angle detection abnormality monitoring section 11 monitors the detection signals $\sin\theta$, $\cos\theta$ of the rotation angle sensor 601 in the auxiliary steering angle detection section 6, and determines the presence or absence of abnormality of the auxiliary steering angle detection section 6 based on a relational expression "$\sin^2\theta + \cos^2\theta = 1$". The result of the determination of the auxiliary steering angle detection abnormality monitoring section 11 is input to the driving section 9, where the processing of stopping the electric motor 212 upon occurrence of abnormality of the auxiliary steering angle detection section 6 is performed. That is, when abnormality is detected by the auxiliary steering angle detection abnormality monitoring section 11, the driving control of the auxiliary steering angle superposition mechanism 2 is stopped.

Next, further detailed reference will be made to the operation of this first embodiment of the present invention, as shown in FIG. 1.

First of all, reference will be made to the state in which the worm gear 211 in the auxiliary steering angle superposition mechanism 2 is held stationary or is prevented from rotation. When the worm gear 211 is held stationary, the ring gear 204 of the first planetary gear mechanism is fixed. Under such a condition, when the driver operates the steering wheel 1, the torque of rotation thereof generated upon steering is transmitted to the sun gear 201 of the first planetary gear mechanism. The rotation of the sun gear 201 is transmitted to the planetary gears 201a, 201b, but at this time, the ring gear 204 is fixed, so the rotation of the sun gear 201 is converted into the orbital motion of the carrier 203 that supports the planetary gears 202a, 202b. Accordingly, the first planetary gear mechanism, serving to rotate the shaft 210 for transmission of rotation to the second planetary gear mechanism, functions as a speed reducer of a planetary gear type. The rotation of the shaft 210 is transmitted to the carrier 208 of the second planetary gear mechanism so as to rotate it, whereby the planetary gears 207a, 207b are driven to revolve around the sun gear 206 in accordance with the rotation of the carrier 208.

Here, in the second planetary gear mechanism, the ring gear 209 is fixed, so the revolutions of the planetary gears 207a, 207b cause the sun gear 206 to rotate whereby the pinion gear 301 in the steering mechanism 3 is driven to rotate. At this time, the second planetary gear mechanism operates as a speed increasing gear, as viewed from the shaft 210. Accordingly, the rotation of the steering wheel 1 is mechanically transmitted to the pinion gear 301 in the steering mechanism 3 with a transmission ratio of "1:1".

Note that the transmission ratio at this time becomes a value which is obtained by multiplication of the speed reduction ratio of the first planetary gear mechanism and the speed reduction ratio (speed increasing ratio) of the second planetary gear mechanism, and if the constructions of both of the planetary gear mechanisms are the same with respect to each other, the transmission ratio as a whole becomes "1". That is, in the construction of the auxiliary steering angle superposition mechanism 2 as shown in FIG. 1, it will be understood that if the rotation of the worm gear 211 is stopped, the steering system becomes an ordinary one in which the transmission ratio between the steering wheel angle $\theta_H$ and the pinion angle $\theta_P$ becomes "1:1".

Now, reference will be made to the case where the electric motor 212 is driven to rotate the worm gear 211 with the steering wheel 1 being fixed.

When the worm gear 211 is driven to rotate, the ring gear 204 is caused to rotate through the worm wheel 205. At this time, the rotation of the ring gear 204 is transmitted to the planetary gears 202a, 202b, but the sun gear 201 is fixed by the steering wheel 1, so the rotation of the ring gear 204 is transmitted to the shaft 210 through the carrier 203 as the revolutions of the planetary gears 202a, 202b. As the shaft 210 rotates, the steering mechanism 3 is driven to steer the steerable road wheels 5a, 5b through the second planetary gear mechanism, as stated above.

Next, reference will be made to the case where the electric motor 212 is driven to rotate the worm gear 211 while operating the steering wheel 1.

In this case, the auxiliary steering angle superposition mechanism 2 is constructed so as to be electrically controlled while responding to the steering wheel 1, so the following expression (4) holds from the above-mentioned expression (3) by using the steering angle of the steering wheel 1 (the steering wheel angle $\theta_H$), the rotation angle of the electric motor 212 (the auxiliary steering angle $\theta_M$), the rotation angle of the pinion gear 301 (the pinion angle $\theta_P$), and the speed ratio $G_S$ from the worm gear 211 to the pinion gear 301.

$$\theta_P = \theta_H + \theta_M / G_S \quad (4)$$

Next, reference will be made, as an example of a specific operation of the transmission characteristic setting section 801 in the target auxiliary steering angle calculation section 8, to a variable gear ratio mechanism that changes the ratio between the steering wheel angle $\theta_H$ and the steered angle $\theta_W$ of the steerable road wheels 5a, 5b in accordance with the traveling condition of the vehicle while referring to FIG. 2 through FIG. 5.

Figure 2:
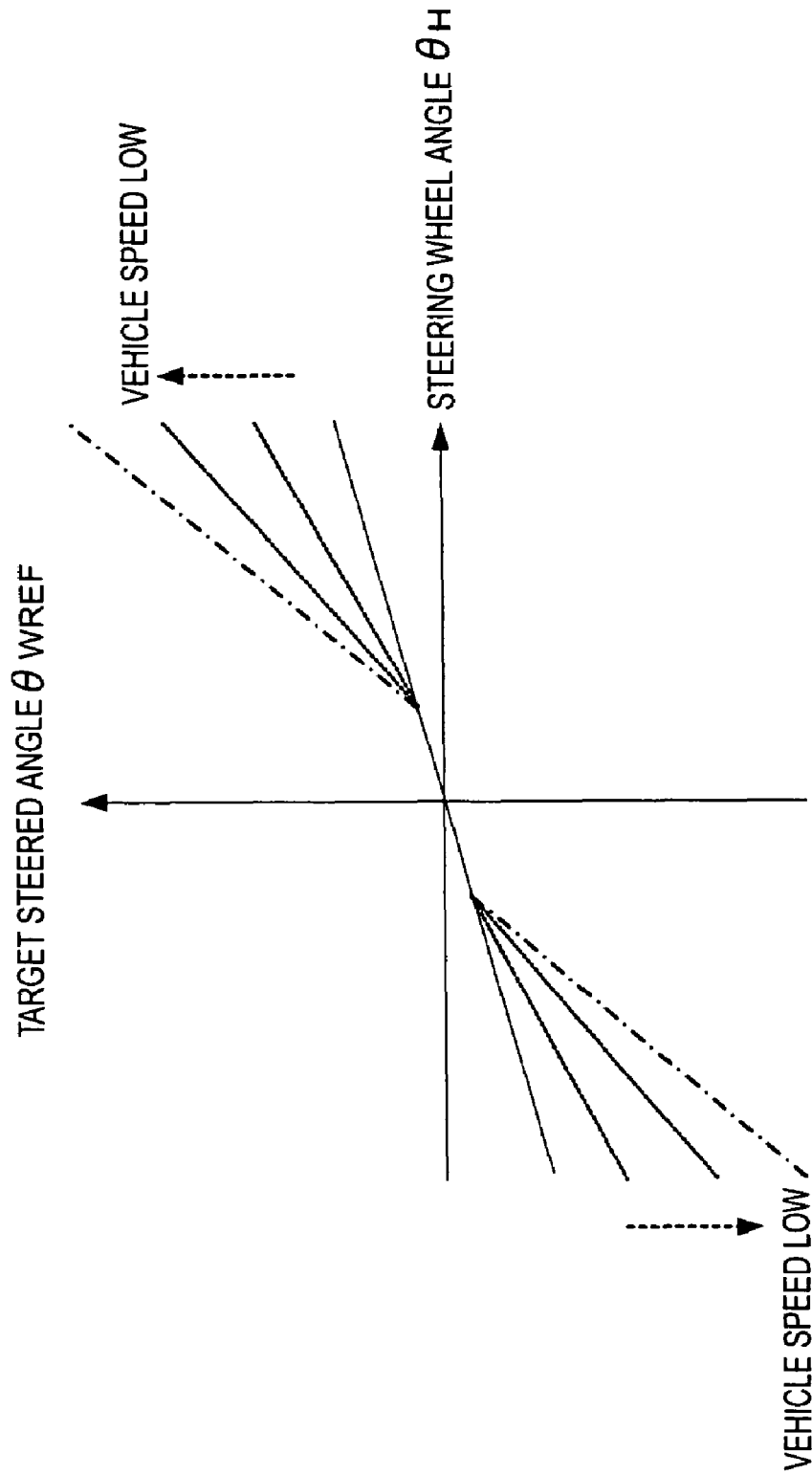
FIG. 2 is an explanatory view illustrating a map and for deciding the relation between a steering wheel angle and a target steered angle in case where a variable gear ratio mechanism is constructed by using the vehicular steering system of FIG. 1.

FIG. 2 is an explanatory view that illustrates a set map of the target steered angle (target steering angle) $\theta_{WREF}$, wherein there is shown the relation of the steering wheel angle $\theta_H$ and the target steered angle $\theta_{WREF}$ upon construction of the variable gear ratio mechanism. In FIG. 2, one example of a map is shown which is used for calculating the target steered angle $\theta_{WREF}$ with respect to the steering wheel angle $\theta_H$ in accordance with the traveling condition of the vehicle (the vehicle speed in this example).

As stated above, the steering wheel angle $\theta_H$ of the steering wheel 1 by the steering operation of the driver is detected by the steering wheel angle detection section 7 and input to the target auxiliary steering angle calculation section 8. Also, the traveling condition of the vehicle is detected by the vehicle travel state detection section 10 and input to the target auxiliary steering angle calculation section 8. At this time, the transmission characteristic setting section 801 in the target auxiliary steering angle calculation section 8 calculates the target steered angle $\theta_{WREF}$ based on the steering wheel angle $\theta_H$ and the vehicle speed (the traveling condition of the vehicle) according to the map shown in FIG. 2. In addition, there is a predetermined relation between the steered angle $\theta_W$ of the steerable road wheels 5a, 5b and the pinion angle $\theta_P$ of the pinion gear 301, so by using the relation therebetween, the transmission characteristic setting section 801 converts the target steered angle $\theta_{WREF}$ into a target pinion angle $\theta_{PREF}$ for the pinion gear 301 in the steering mechanism 3.

Further, the target auxiliary steering angle calculation section 8 calculates the target auxiliary steering angle $\theta_{MREF}$ by using the relation between the target pinion angle $\theta_{PREF}$ and the above expression (4) through the calculation processing of the following expression (5).

$$\theta_{MREF}=G_S(\theta_{PREF}-\theta_H) \quad (5)$$

Figure 3:
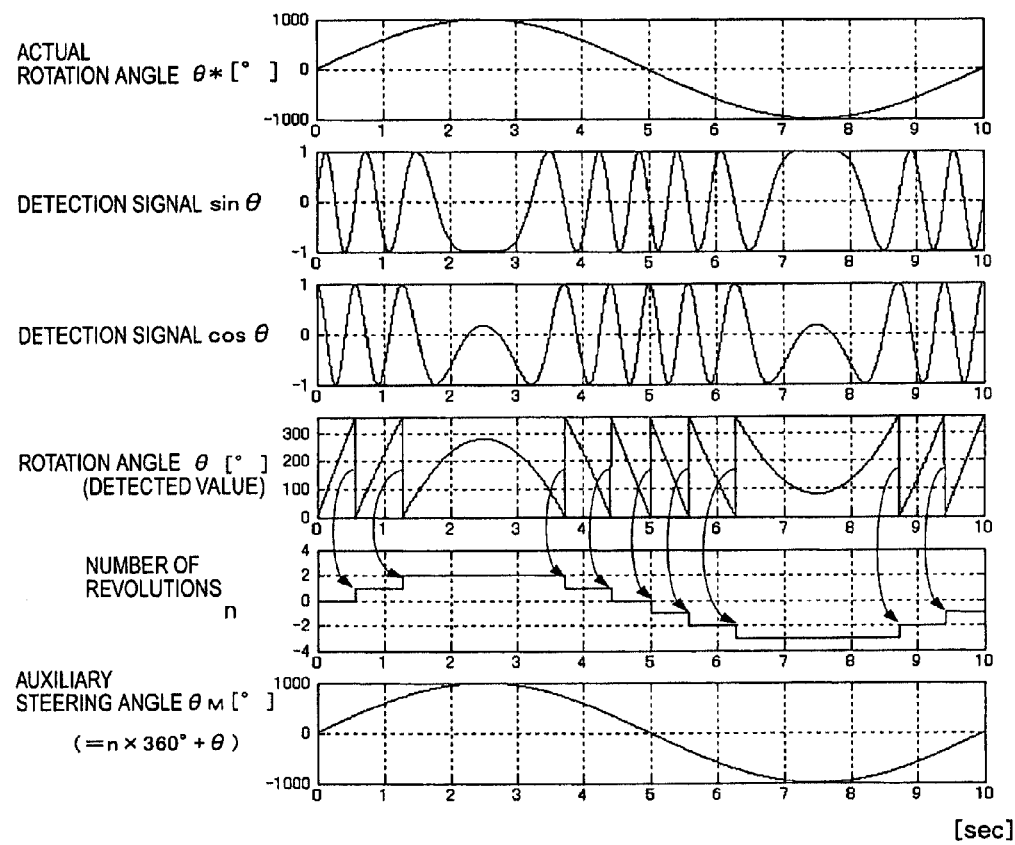
FIG. 3 is a timing chart explaining the operation of an auxiliary steering angle detection section according to the first embodiment of the present invention.

FIG. 3 is a timing chart that explains a specific operation of the auxiliary steering angle detection section 6, wherein there are shown, as one example, individual signal waveforms when the auxiliary steering angle $\theta_M$ corresponding to the actual rotation angle $\theta^*$ of the electric motor 212 is detected.

First of all, the rotation angle sensor 601 in the auxiliary steering angle detection section 6 detects the rotation angle $\theta$ of the electric motor 212 (or the worm gear 211) of the auxiliary steering angle superposition mechanism 2. At this time, the rotation angle sensor 601 outputs two detection signals corresponding to $\sin \theta$ and $\cos \theta$, as previously stated.

In FIG. 3, for example, if the actual rotation angle $\theta^*$ of the electric motor 212 has changed in a sinusoidal manner, the detection signals $\sin \theta$, $\cos \theta$ from the rotation angle sensor 601 take waveforms shown in this figure, respectively. Here, note that the amplitudes of the detection signals $\sin \theta$, $\cos \theta$ are expediently described here as "1". As the rotation angle sensor 601, there may be used a variety of well-known sensors such as a resolver, a sensor for detecting the direction of a magnetic flux by using an AMR (anisotropic magnetoresistive element), etc.

The detection signals $\sin \theta$, $\cos \theta$ corresponding to the rotation angle $\theta$ are input to the rotation angle calculation section 602 in which the rotation angle $\theta$ is calculated from these detection signals based on the following expression (6).

$$\theta=\tan^{-1}(\sin \theta/\cos \theta) \quad (6)$$

where the rotation angle $\theta$ is a value within the range of $0° \leq \theta < 360°$.

Here, note that both $\sin \theta$ and $\cos \theta$ are periodic functions, and hence in the above-mentioned calculation processing, the rotation angle $\theta$ can be measured only within the range of from 0 degrees to 360 degrees, and it is not possible to detect the rotation angle $\theta$ corresponding to the actual rotation angle $\theta^*$ in an accurate manner, as shown in FIG. 3.

Accordingly, the rotation angle $\theta$ calculated by the rotation angle calculation section 602 is input to the multi-revolution counting section 603 in which the rotation angle 602a is processed in a time series manner thereby to count the number of revolutions per minute n of the electric motor 212. That is, as shown by arrows in FIG. 3, the multi-revolution counting section 603 counts up the number of revolutions per minute n (count value) when the rotation angle $\theta$ has changed from 360 degrees to 0 degrees, but conversely counts down the number of revolutions per minute n (count value) when the rotation angle $\theta$ has changed from 0 degrees to 360 degrees. The multi-revolution counting section 603 inputs the number of revolutions per minute n thus counted to the auxiliary steering angle calculation section 604.

The auxiliary steering angle calculation section 604 accurately calculates the auxiliary steering angle $\theta M$ by using the number of revolutions n from the multi-revolution counting section 603 and the rotation angle $\theta$ from the rotation angle calculation section 602, as shown by the following expression (7), and inputs it to the driving section 9.

$$\theta_M = n \times 360° + \theta \quad (7)$$

Not only the auxiliary steering angle $\theta_M$ from the auxiliary steering angle detection section 6 but also the target auxiliary steering angle $\theta_{MREF}$ from the target auxiliary steering angle calculation section 8 is input to the driving section 9. The target driving amount calculation section 901 in the driving section 9 calculates, based on a deviation between the target auxiliary steering angle $\theta_{MREF}$ and the auxiliary steering angle $\theta_M$ (detected value), a target amount of driving of the electric motor 212 in the auxiliary steering angle superposition mechanism 2 in such a manner that the following expression (8) can hold.

$$\theta_{MREF} - \theta_M = 0 \quad (8)$$

The target amount of driving is, for example, in the form of a target current to be supplied to the electric motor 212. The motor drive section 902 drives the electric motor 212 in accordance with the target amount of driving (the target current) from the target driving amount calculation section 901.

Next, reference will be made to the operation of the vehicular steering system when abnormality occurs in the auxiliary steering angle detection section 6.

When one of the two detection signals $\sin \theta$, $\cos \theta$ from the rotation angle sensor 601 is not input to the rotation angle calculation section 602 due to a break, disconnection, etc., for example, as stated above, the auxiliary steering angle calculation section 604 can not output the accurate auxiliary steering angle $\theta_M$. At this time, if the driving section 9 drives the electric motor 212 based on the above expression (8) by using the inaccurate auxiliary steering angle $\theta_M$, the steerable road wheels 5a, 5b are steered in a direction quite different from the driver's intention.

Accordingly, in order to avoid this, the auxiliary steering angle detection abnormality monitoring section 11 is arranged, as shown in FIG. 1, so that the detection signals $\sin \theta$, $\cos \theta$ from the rotation angle sensor 601 are input to the auxiliary steering angle detection abnormality monitoring section 11. Specifically, the detection signals $\sin \theta$, $\cos \theta$ are output in the form of physical quantities such as a voltage, a current, etc., in accordance with the characteristic of the rotation sensor 601.

Figure 4:
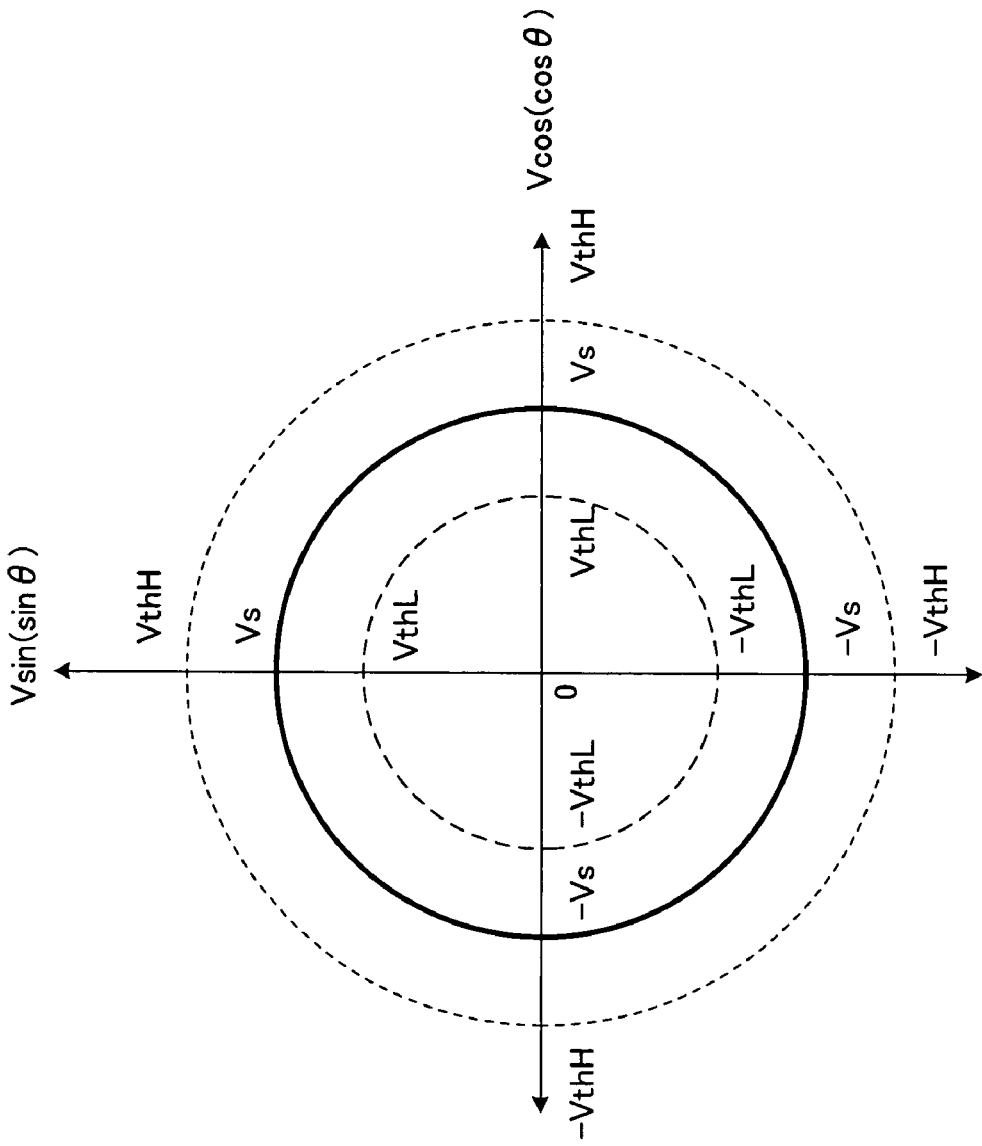
FIG. 4 is an explanatory view for explaining the operation of an auxiliary steering angle detection abnormality monitoring section according to the first embodiment of the present invention.
Figure 5:
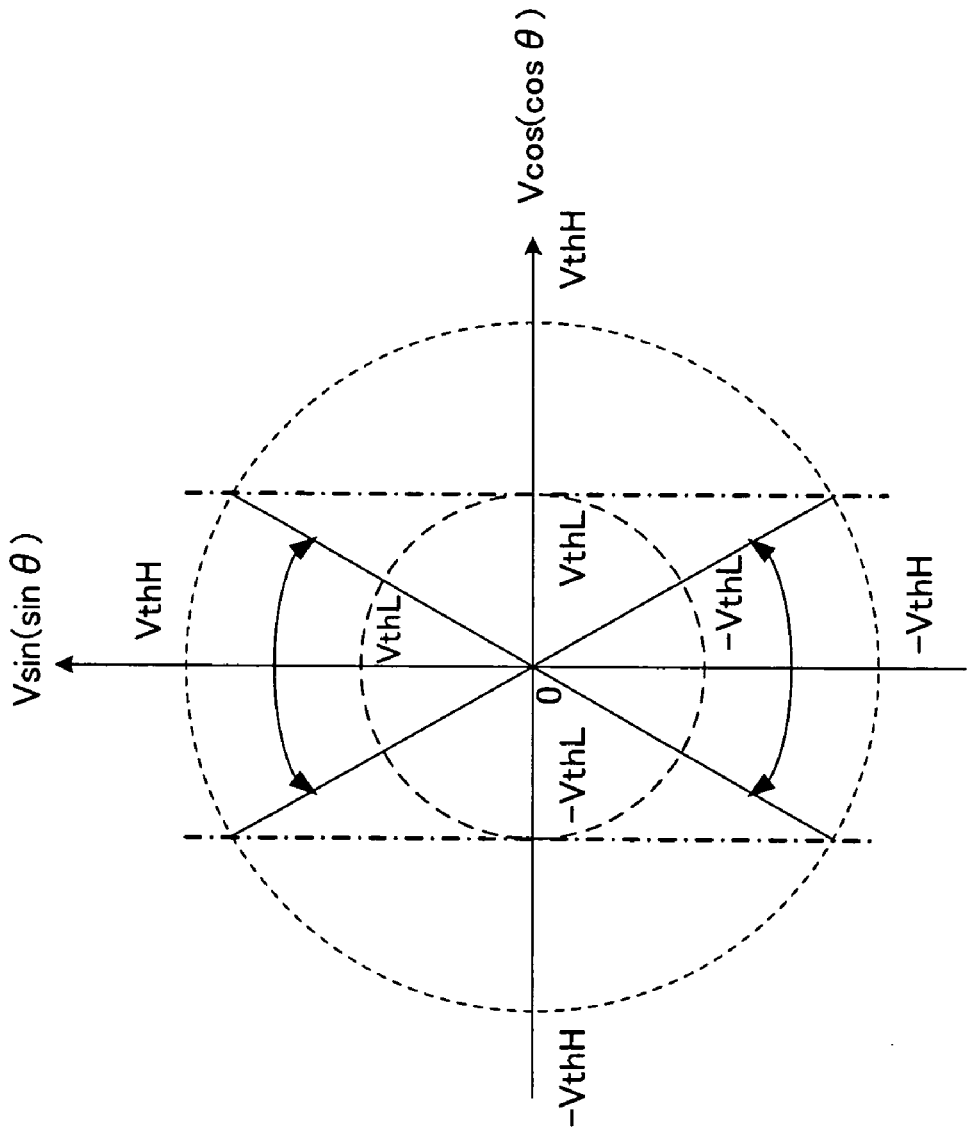
FIG. 5 is an explanatory view showing abnormality detection ranges of an auxiliary steering angle detection section according to the first embodiment of the present invention.

FIG. 4 and FIG. 5 are explanatory views that show the relations between the detection signals $\sin \theta$, $\cos \theta$ output from the rotation angle sensor 601. As shown in FIG. 4, graphically representing the detection signals $\sin \theta$, $\cos \theta$ in the form of a voltage output having an amplitude Vs with the $\cos \theta$ and the $\sin \theta$ being taken as the axis of abscissa and the axis of ordinate, respectively, a Lissajous circle is ideally formed (see a solid line).

However, the rotation sensor 601 has individual variation or difference in its temperature characteristic, accuracy, etc., so the detection signals $\sin \theta$, $\cos \theta$, if output normally, have variation generated in the amplitude Vs thereof. Accordingly, the Lissajous circle drawn or formed by the normal detection signals $\sin \theta$, $\cos \theta$ becomes between a lower limit circle (VthL to -VthL) and an upper limit circle (VthH to -VthH) on concentric circles with respect to the ideal Lissajous circle, as shown within the range of a broken line in FIG. 4.

The auxiliary steering angle detection abnormality monitoring section 11 monitors whether the Lissajous circle formed by the detection signals sin θ, cos θ exists in the range between the lower limit circle and the upper limit circle. That is, a determination as to whether the following expression (9) is satisfied is made based on output voltages Vsin, Vcos of the detection signals sin θ, cos θ, respectively, a radius VthL of the lower limit circle, and a radius VthH of the upper limit circle.

$$VthL^2 < V\sin^2 + V\cos^2 < VthH^2 \quad (9)$$

When the above expression (9) is satisfied, the auxiliary steering angle detection abnormality monitoring section 11 determines that the auxiliary steering angle detection section 6 is normal, whereas when the above expression (9) is not satisfied, it is determined that the auxiliary steering angle detection section 6 is abnormal. For example, the case where the output voltage Vsin always becomes "0" due to the abnormality of the detection signal sin θ, an abnormality determination is made from the above expression (9) only when the following expression (10) is satisfied.

$$V\cos < VthL \quad (10)$$

It will be understood that a region in which an abnormality determination can be made at this time is limited, as shown in FIG. 5 (see an arrow region).

Here, reference will be made to the case where abnormality has occurred in a region in which an abnormality determination can not be made, As stated above, when abnormality occurs in the detection signals sin θ, cos θ, the auxiliary steering angle $\theta_M$ detected by the auxiliary steering angle detection section 6 becomes an abnormal value, so when the driving section 9 drives the electric motor 212 by using the abnormal auxiliary steering angle $\theta_M$, the steerable road wheels 5a, 5b are steered in a direction not intended by the driver. Thus, when the steerable road wheels 5a, 5b are driven in the direction not intended by the driver, the auxiliary steering angle $\theta_M$, even if being in a region where abnormality detection can not be made (hereinafter referred to as an abnormality undetectable region), is driven to come to a region in which abnormality detection can be made (hereinafter referred to as an abnormality detectable region), so at that time, the auxiliary steering angle detection abnormality monitoring section 11 can make abnormality detection. The rotation of the auxiliary steering angle $\theta_M$ at this time is less than or equal to 180 degrees, as can be seen from FIG. 5, and the influence of the auxiliary steering angle $\theta_M$ on the rotation of the pinion gear 301, being the product of its rotation and the speed ratio $G_S$ from the worm gear 211 to the pinion gear 301, is small to a negligible extent, as is clear from the above-mentioned expression (4). In addition, even in case where the auxiliary steering angle $\theta_M$ is not driven to the abnormality undetectable region, it is meant that there is substantially no change in the auxiliary steering angle $\theta_M$, and hence the influence exerted on the driver's steering is also small.

Further, when abnormality of the auxiliary steering angle detection section 6 is detected, the auxiliary steering angle detection abnormality monitoring section 11 stops the driving of the electric motor 212 by means of the driving section 9. Here, note that to stop the driving of the electric motor 212 means that the electric motor 212 is put into a non-rotating state. For example, in case where the relation between the worm gear 211 and the warm wheel 205 is constructed such that the worm gear 211 can not be rotated from the worm wheel 205 side (i.e., so-called is self-locked), the power supply to the electric motor 212 may be inhibited or cut off drive upon stopping of the driving.

Alternatively, provision may be made for a fixed section that mechanically fixes those portions (e.g., the worm gear 211, the warm wheel 205, etc.) on which the auxiliary steering angle is superposed in operation, so that the worm gear 211 or the warm wheel 205 is fixed upon stopping of the driving.

In the above-mentioned first embodiment, the target auxiliary steering angle $\theta_{MREF}$ is calculated and the auxiliary steering angle $\theta_M$ is detected so that the electric motor 212 is driven so as to make the auxiliary steering angle $\theta_M$ coincide with the target auxiliary steering angle $\theta_{MREF}$, but the target pinion angle $\theta_{PREF}$ may instead be set and the pinion angle $\theta_P$ may be detected by a section similar to the auxiliary steering angle detection section 6, so that the electric motor 212 is driven to make both of these angles coincide with each other. In addition, the electric motor 212 is used, as the rotational member in the auxiliary steering angle superposition mechanism 2, for detecting the rotation angle θ of the electric motor 212, but other rotational members may be used as an object to be detected for this purpose.

As described above, the vehicular steering system according to the first embodiment of the present invention has the steering mechanism 3 for steering the steerable road wheels 5a, 5b by means of the steering wheel 1 to be operated by the driver and the electrically controllable auxiliary steering angle superposition mechanism 2. The system includes a steering wheel angle detection section 7 that detects a steering wheel angle $\theta_H$ of the steering wheel 1 operated by the driver, the auxiliary steering angle detection section 6 that detects the auxiliary steering angle $\theta_M$ to be superposed by the auxiliary steering angle superposition mechanism 2, the transmission characteristic setting section 801 that sets the transmission characteristic between the steering wheel angle $\theta_H$ and the steered angle $\theta_W$ of the steerable road wheels 5a, 5b in accordance with the traveling condition of the vehicle, the target auxiliary steering angle calculation section 8 that calculates the target auxiliary steering angle $\theta_{MREF}$ for the auxiliary steering angle to be superposed by the auxiliary steering angle superposition mechanism 2 in accordance with the transmission characteristic, and the driving section 9 that drives the auxiliary steering angle superposition rudder mechanism 2 in such a manner that the auxiliary steering angle $\theta_M$ detected by the auxiliary steering angle detection section 6 coincides with the target auxiliary steering angle $\theta_{MREF}$.

In addition, the auxiliary steering angle detection section 6 has the rotation angle sensor 601 and the rotation angle calculation section 602 for detecting the rotation angle θ corresponding to the actual rotation angle θ* of the rotational member (the electric motor 212) in the auxiliary steering angle superposition mechanism 2. The rotation angle calculation section 602 calculates the rotation angle θ of the rotational member based on the detection signals sin θ, cos θ of the rotation angle sensor 601.

The rotational member, which constitutes the auxiliary steering angle superposition mechanism 2, has the correlation of the following expression (11) by using the strict auxiliary steering angle θS and the rotation angle $\theta_M$ of the electric motor 212.

$$\theta S = \theta_M / G \quad (11)$$

where G is a speed reduction ratio from the rotation angle $\theta_M$ of the electric motor 212 to the auxiliary steering angle $\theta S$.

Also, the auxiliary steering angle detection section 6 has the multi-revolution counting section 603 and the auxiliary steering angle calculation section 604 for calculating the rotation angle $\theta_M$ of the electric motor 212 as the auxiliary steering angle $\theta_M$. Here, the rotation angle $\theta_M$ of the electric motor 212 has a correlation represented by the following expression (12).

$$\theta_M = \tan^{-1}(\sin \theta / \cos \theta) \qquad (12)$$

where "$\tan^{-1}$" means the inverse function of "tan", and the absolute angle of the rotation angle $\theta_M$ can be detected within the range of from 0 degrees to 360 degrees.

Moreover, the multi-revolution counting section 603 for counting the number of revolutions n per minute of the rotational member counts up or down the number of revolutions per minute n each time the rotation angle $\theta_M$ passes a calculation angle. The strict auxiliary steering angle $\theta S$ can be calculated, as shown by the following expression (13), by using the number of revolutions n per minute of the rotational member thus counted by the multi-revolution counting section 603.

$$\theta S = (n \times 360° + \theta_M)/G \qquad (13)$$

Further, the auxiliary steering angle signal monitoring tool 11 determines, from the detection signals sin θ, cos θ of the rotation angle sensor 601 in the auxiliary steering angle detection section 6, whether at least a relation of "$\sin^2 \theta_M + \cos^2 \theta_M = 1$" substantially holds, and detects the presence or absence of abnormality of the auxiliary steering angle detection section 6, whereby abnormality of the auxiliary steering angle detection section 6 can be independently detected at an early time.

Furthermore, upon detection of the abnormality of the auxiliary steering angle detection section 6, the auxiliary steering angle detection abnormality monitoring section 11 stops the driving of the electric motor 212 by means of the driving section 9, and fixes the auxiliary steering angle $\theta_M$ superposed at that time, whereby the steered motion of the steerable road wheels 5a, 5b not intended by the driver can be suppressed to a minimum.

Embodiment 2

In the above-mentioned first embodiment, the auxiliary steering angle detection abnormality monitoring section 11 stops the driving of the electric motor 212 by means of the driving section 9 when detecting the abnormal state of the auxiliary steering angle detection section 6, but upon detection of the abnormality of only one of the detection signals sin θ, cos θ, the rotation angle of the electric motor 212 may be estimated based only on the other normal detection signal, and the electric motor 212 may be driven by using the auxiliary steering angle $\theta_M$ calculated based on the thus estimated rotation angle.

Figure 6:
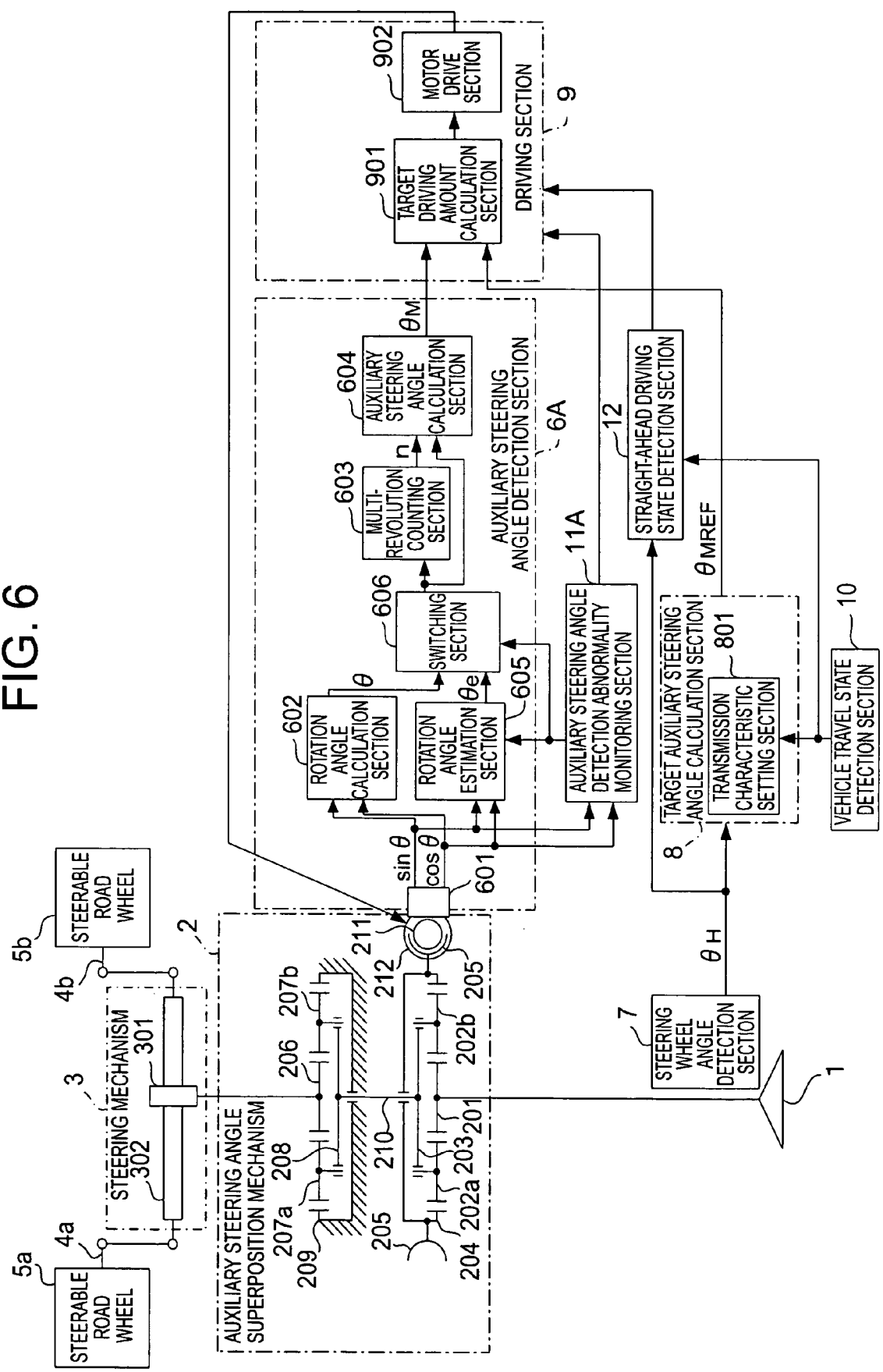
FIG. 6 is a block diagram schematically showing the overall configuration of a vehicular steering system according to a second embodiment of the present invention.

FIG. 6 is a block diagram that shows a vehicular steering system with a rotation angle estimation section, which is activated upon detection of only one of the detection signals, according to a second embodiment of the present invention comprising the activated at the abnormality detection. In FIG. 6 the same parts or components as those described above (see FIG. 1) are identified by the same symbols or by the same symbols with "A" affixed to their ends, while omitting a detailed explanation thereof.

In this case, an auxiliary steering angle detection section 6A is provided, in addition to the above-mentioned construction, with a rotation angle estimation section 605 and a switching section 606 30 which are activated upon detection of abnormality of only one of the detection signals sin θ, cos θ. Also, as a detection section associated with the driving section 9, there is provided a straight-ahead driving state detection section 12 that detects the straight-ahead driving state of the vehicle. The construction of FIG. 6 is similar to the above-mentioned one (see FIG. 1) except for the addition of the straight-ahead driving state detection section 12, the rotation angle estimation section 605 and the switching section 606.

The rotation angle estimation section 605 in the auxiliary steering angle detection section 6A has a function to calculate an estimated rotation angle θe based on only one of the detection signals sin $f$, cos θ, whereby it calculates the estimated rotation angle θe based on the other normal the detection signals when abnormality in only one of the detection signals sin θ, cos θ is detected by an auxiliary steering angle detection abnormality monitoring section 11A, and inputs the estimated rotation angle θe to the multi-revolution counting section 603 through the switching section 606.

The switching section 606 selects either of an output value (rotation angle θ) of the rotation angle calculation section 602 or an output value (estimated rotation angle θe) of the rotation angle estimation section 605 as an input signal to the multi-revolution counting section 603 in accordance with the result of the determination of the auxiliary steering angle detection abnormality monitoring section 11A. That is, the switching section 606 inputs the rotation angle θ from the rotation angle calculation section 602 to the multi-revolution counting section 603 at the time of normal operation in which no abnormality is detected, but inputs the estimated rotation angle θe from the rotation angle estimation section 605 to the multi-revolution counting section 603 when abnormality in only one of the detection signals sin θ, cos θ is detected. Accordingly, during normal operation, the driving section 9 drives the auxiliary steering angle superposition mechanism 2 so as to make the auxiliary steering angle $\theta_M$ calculated based on the rotation angle θ coincide with the target auxiliary steering angle $\theta_{MREF}$, whereas when abnormality in only one of the detection signals sin θ, cos θ is detected, the driving section 9 drives the auxiliary steering angle superposition mechanism 2 so as to make the auxiliary steering angle $\theta_M$ calculated based on the estimated rotation angle θe coincide with the target auxiliary steering angle $\theta_{MREF}$.

The straight-ahead driving state detection section 12 detects the straight-ahead driving state of the vehicle (termination state of driver's right or left steering) based on the detected value (the steering wheel angle $\theta_H$) from the steering wheel angle detection section 7 and the detected value (the traveling condition of the vehicle) from the vehicle travel state detection section 10, and stops the driving of the electric motor 212 in the auxiliary steering angle superposition mechanism 2 by means of the driving section 9 when the straight-ahead driving state is detected.

Now, reference will be made to the operation of the vehicular steering system according to the second embodiment of the present invention as illustrated in FIG. 6 while focusing on differences thereof from the above-mentioned one (FIG. 1).

Similarly as stated above, the auxiliary steering angle detection abnormality monitoring section 11 detects whether there is abnormality in the detection signals sin θ, cos θ from the rotation angle sensor 601, and stops the driving of the electric motor 212 by the driving section 9 when both of the detection signals sin θ, cos θ become "0" due to the failure of common parts necessary to output the detection signals sin θ, cos θ. In addition, the auxiliary steering angle detection abnormality monitoring section 11A is constructed to be able to detect a failure (abnormality) in only either of the detection signals sin θ, cos θ, so that upon detection of only one of the two detection sections, the rotation angle estimation section 605 and the switching section 606 in the auxiliary steering angle detection section 6A are activated without stopping the driving section 9. The rotation angle estimation section 605 selects a normal signal among the detection signals sin θ, cos θ based on the result of the determination of the auxiliary steering angle detection abnormality monitoring section 11A, and calculates the estimated rotation angle θe of the worm gear 211 by using one normal detection signal.

Figure 7:
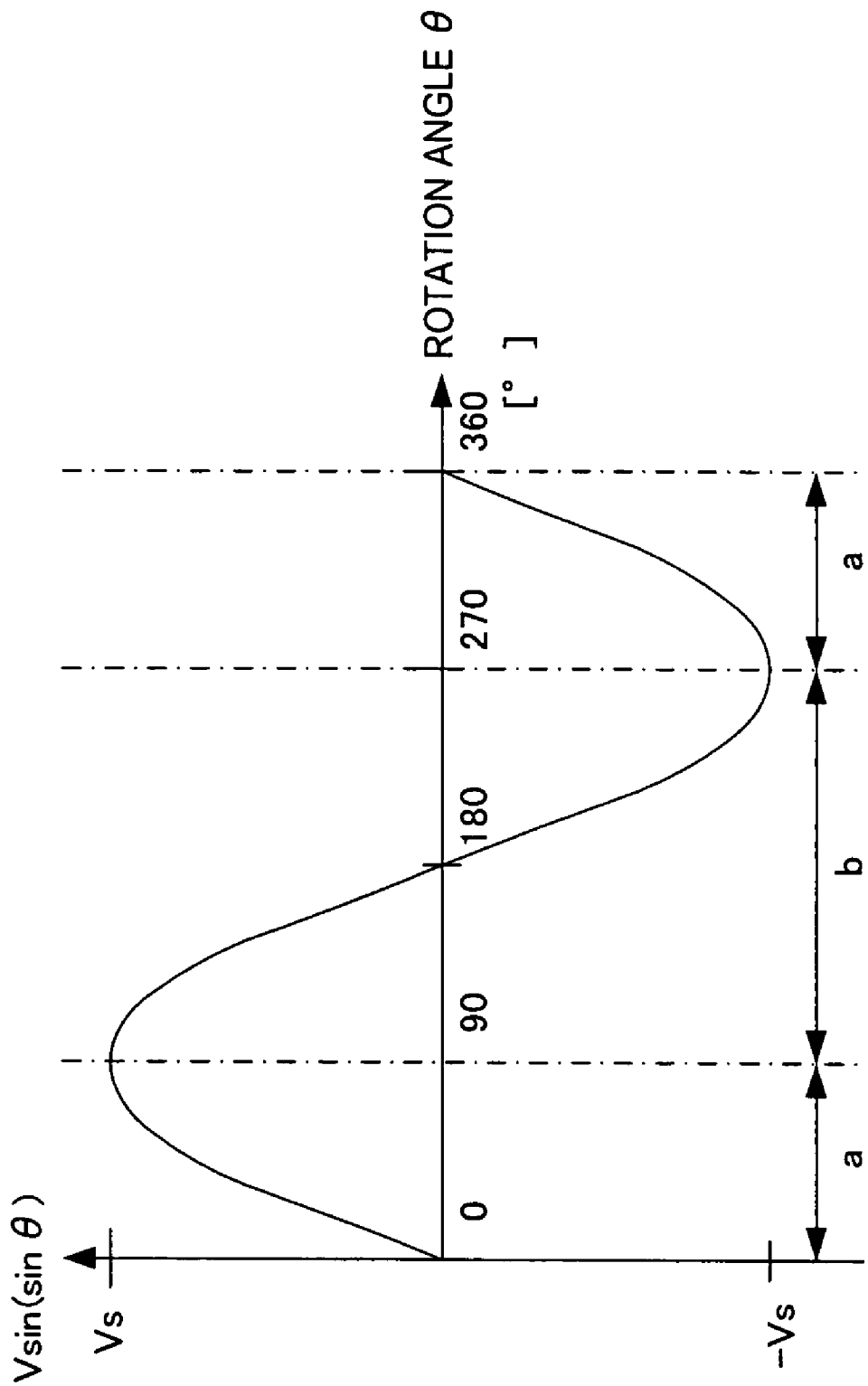
FIG. 7 is a waveform chart showing normal detection signals of an auxiliary steering angle detection section according to the second embodiment of the present invention.

Hereinafter, reference will be made to a method for calculating the estimated rotation angle θe according to the rotation angle estimation section 605 while referring to FIG. 7. FIG. 7 is a waveform chart that shows a normal detection signal from the auxiliary steering angle detection section 6A. For example, when the detection signal sin θ is normal, there exists a relation between the rotation angle θ and the detection signal sin θ, as shown in FIG. 7.

As can be seen from FIG. 7, it is impossible to determine, from the one detection signal sin θ alone, whether the rotation angle θ is in a region a (0 <θ<90, 270<θ<360) or a region b (90<θ<270) in FIG. 7, so it is difficult to estimate the rotation angle θ.

Here, reference will be made to the properties of the regions a and b while taking account of the motion of the electric motor 212 due to the detection signals sin θ in a time series manner.

First of all, the detection signal sin θ with the electric motor 212 rotating in a forward direction (i.e., in a direction to increase the rotation angle θ) has a positive slope in the region a and a negative slope in the region b. On the contrary, the detection signal sin θ with the electric motor 212 rotating in a negative direction (i.e., in a direction to decrease the rotation angle θ) has a negative slope in the region a and a positive slope in the region b. Accordingly, the rotation angle θ can be estimated with the use of the slope of the property of the detection signal sin θ by processing the rotational direction of the electric motor 212 and the detection signal sin θ in a time series manner. Here, note that noise or the like is superposed on the detection signal sin θ when the detection signal sin θ is processed in a time series manner to calculate the slope, so it is better to set the resolution of the rotation angle θ to a relatively low value so as to avoid the influence of noise, etc.

Figure 8:
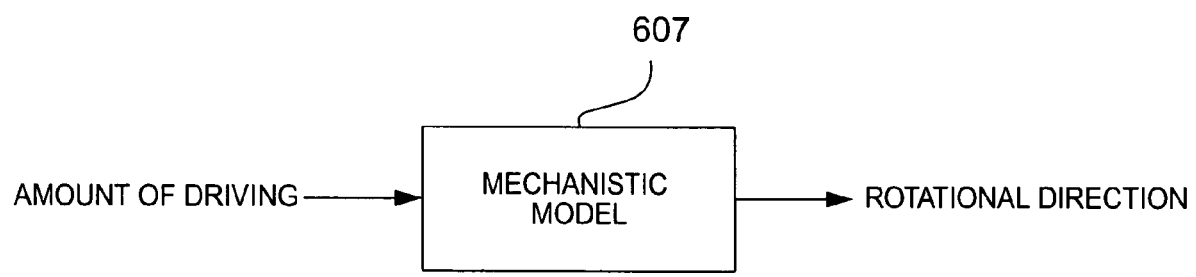
FIG. 8 is a block diagram conceptually showing a mechanistic model for estimating the rotational direction of an electric motor from an amount of driving an auxiliary steering angle superposition mechanism according to the second embodiment of the present invention.

Also, as shown in a block diagram in FIG. 8, for example, the rotational direction of the electric motor 212 may be estimated by detecting an actual amount of driving of the electric motor 212 and performing calculations using a mechanistic model 607 that represents the characteristic of the auxiliary steering angle superposition mechanism 2. FIG. 8 is the block diagram that conceptually shows the mechanistic model 607 for estimating the rotational direction of the electric motor 212 from the amount of driving the auxiliary steering angle superposition mechanism 2. Thus, the rotation angle can be estimated by inputting the amount of driving of the electric motor 212 to the mechanistic model 607 and executing arithmetic calculations.

Returning to FIG. 6, the rotation angle θ from the rotation angle calculation section 602 and the estimated rotation angle θe from the rotation angle estimation section 266 are input to the switching section 606. The switching section 606 outputs the rotation angle θ from the rotation angle calculation section 602 when the result of the determination of the auxiliary steering angle detection abnormality monitoring section 11A indicates the absence of abnormality in the detection signals sin θ, cos θ of the rotation angle sensor 601. In addition, when the result of the determination of the auxiliary steering angle detection abnormality monitoring section 11A indicates the presence of abnormality in only one of the detection signals sin θ, cos θ, the switching section 606 outputs the estimated rotation angle θe from the rotation angle estimation section 605. That is, when abnormality is found in only one of the detection signals sin θ, cos θ, the auxiliary steering angle θ$_M$ is calculated based on the estimated rotation angle θe and is input to the driving section 9.

The driving section 9 drives the electric motor 212 in the auxiliary steering angle superposition mechanism 2 by using the target auxiliary steering angle θ$_{MREF}$ from the target auxiliary steering angle calculation section 8 and the auxiliary steering angle θ$_M$ calculated based on the estimated rotation angle θe. As a result, even if abnormality occurs in only one of the detection signals sin θ, cos θ, the control of the electric motor 212 is continued based on the auxiliary steering angle θ$_M$ calculated from the estimated rotation angle θe, so it is possible to keep the transmission characteristic between the steering angle (the steering wheel angle θ$_H$) of the steering wheel 1 and the steered angle θ$_W$ of the steerable road wheels 5a, 5b.

As described above, according to the second embodiment of the present invention, provision is made for the rotation angle estimation section 605 that calculates the estimated rotation angle θe from only either one of the detection signals sin θ, cos θ, and the switching section 606, and when abnormality is detected in only either one of the detection signals sin θ, cos θ, the auxiliary steering angle detection abnormality monitoring section 11A activates the rotation angle estimation section 605 so that the estimated rotation angle θe is calculated based on only the other normal detection signal. As a consequence, the driving section 9 drives the auxiliary steering angle superposition rudder mechanism 2 in such a manner that the auxiliary steering angle θ$_M$ from the auxiliary steering angle calculation section 604 coincides with the target auxiliary steering angle θ$_{MREF}$. Accordingly, even when there occurs abnormality in only either one of the detection signals sin θ, cos θ during the driver's steering operation, the control of the auxiliary steering angle θ$_M$ can be continued by calculating the estimated rotation angle θe based on the other normal detection signal.

In addition, the transmission characteristic between the steering wheel 1 and the steerable road wheels 5a, 5b does not change, so even if abnormality occurs for example in the course of steering for lane change, etc., the transmission characteristic between the steering wheel angle θ$_H$ and the steered angle θ$_W$ of the steerable road wheels 5a, 5b is not changed during the steering operation, thus making it possible to keep the steering as intended by the driver.

Moreover, provision is made for the straight-ahead driving state detection section 12 that detects the straight-ahead driving state of the vehicle, and the driving of the auxiliary steering angle superposition mechanism 2 is controlled so as to make the target auxiliary steering angle θ$_{MREF}$ and the detected auxiliary steering angle θ$_M$ coincide with each other until the straight-ahead driving state detection section 12 detects the straight-ahead driving state of the vehicle, and stops, after detection of the straight-ahead driving state, the driving control of the auxiliary steering angle superposition mechanism 2.

Accordingly, even if abnormality in only either one of the detection signals sin θ, cos θ occurs during the steering operation of the driver, the steering as intended by the driver becomes possible, and the driving of the auxiliary steering angle superposition mechanism is stopped when the vehicle comes to a straight-ahead driving state, so the steering system becomes equivalent to an ordinary steering system in a state where the neutral point of the steering wheel 1 and the neutral point of the steerable road wheels 5a, 5b are in coincidence with each other. As a result, it is possible to suppress the driver's uncomfortable feeling to a minimum even in steering after the driving of the auxiliary steering angle superposition mechanism 2 is stopped.

Further, the straight-ahead driving state detection section 12 can determine the termination time of the driver's right or left steering operation by detecting when the vehicle becomes the straight-ahead driving state. As a determination method for the straight-ahead driving state of the vehicle, a determination that the vehicle is in the straight-ahead driving state can be made, for example, when the steering wheel angle $\theta_H$ from the steering wheel angle detection section 7 is in a neutral state, and when the neutral state has continued a predetermined time or more. Alternatively, the vehicle travel state detection section 10 may include a yaw rate sensor, and when the yaw rate of the vehicle detected by the yaw rate sensor indicates "0" and when the steering wheel angle $\theta_H$ indicates the neutral position of the steering wheel 1, a determination can be made that the vehicle is in the straight-ahead driving state.

Furthermore, the straight-ahead driving state detection section 12 stops the driving of the electric motor 212 in the auxiliary steering angle superposition mechanism 2 by the driving section 9 upon detection of the straight-ahead driving state of the vehicle, but at this time, the steering wheel 1 is in its neutral position and the steerable road wheels 5a, 5b are also in their neutral positions. That is, the auxiliary steering angle $\theta_M$ to be superposed becomes "0" and is thereafter fixed to "0". Accordingly, after the time point at which the auxiliary steering angle $\theta_M$ has been fixed to "0", the steering system according to this second embodiment operates as an ordinary steering system, as described in the above-mentioned first embodiment, in which the ratio between the amount of steering of the steering wheel 1 (the steering wheel angle $\theta_H$) and the amount of rotation of the pinion gear 301 (the pinion angle $\theta_P$) is 1:1 and the neutral points of both of them coincide with each other.

Embodiment 3

Figure 9:
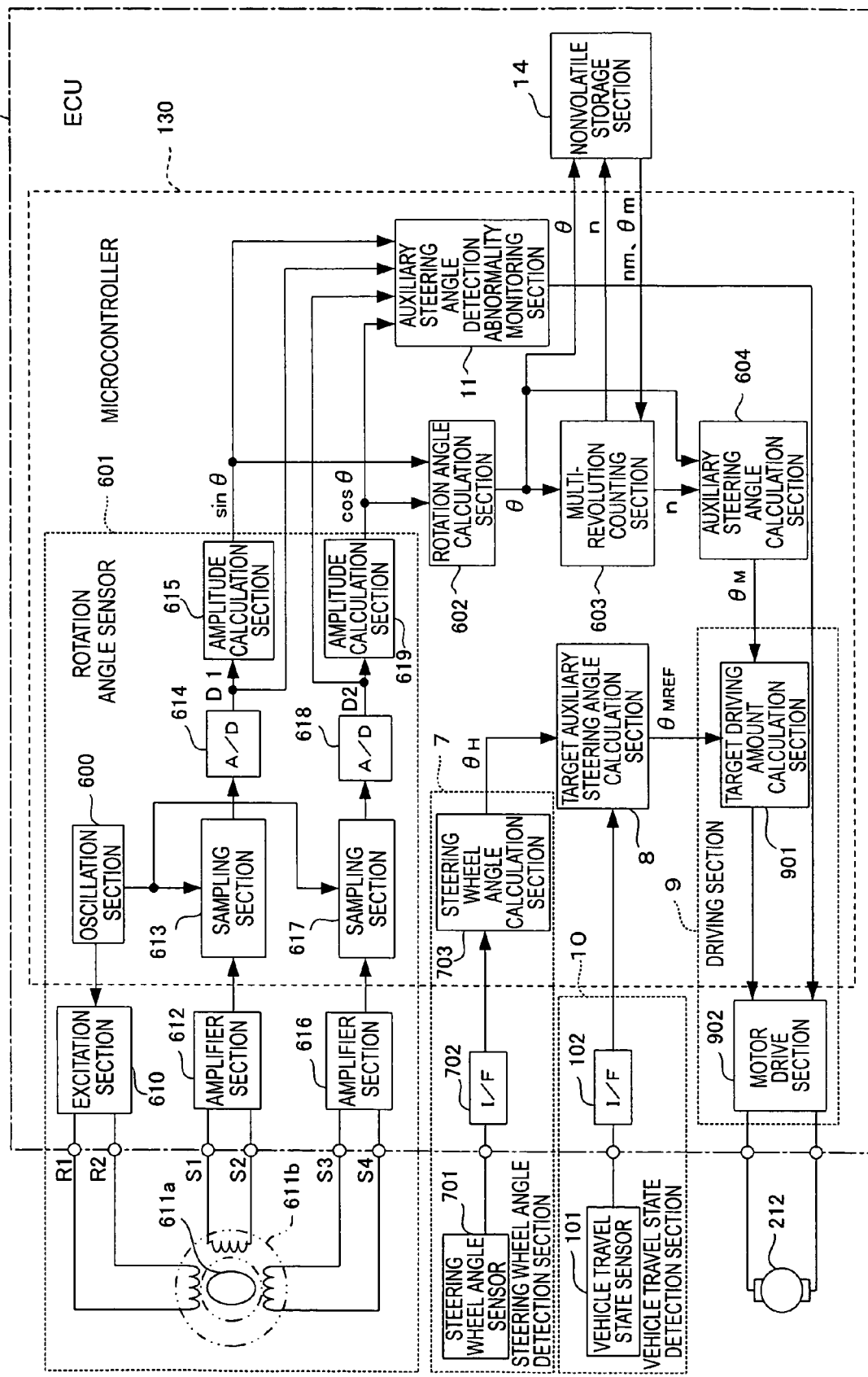
FIG. 9 is a block diagram schematically showing the overall configuration of a vehicular sterling system excluding an auxiliary steering angle superposition mechanism according to a third embodiment of the present invention.

Although in the above-mentioned first and second embodiments, no mention has been made to the processing at the time when the control of the auxiliary steering angle superposition mechanism 2 is stopped and resumed through the auxiliary steering angle detection sections 6, 6A and the driving section 9, provision may be made for a nonvolatile storage section 14 that is connected to a microcontroller 130 including an auxiliary steering angle detection section 6, etc., as shown in FIG. 9, wherein the rotation angle θ (detected value) and the number of revolutions per minute n (count value) of a rotational member are stored in the nonvolatile storage section 14 when the control of an auxiliary steering angle superposition mechanism 2 is stopped, and the data thus stored are used for the control of the auxiliary steering angle superposition mechanism 2 when such control is restarted or resumed.

FIG. 9 is a block diagram that shows a vehicular steering system according to a third embodiment of the present invention, in which the same or corresponding parts or elements as those as described above (see FIG. 1) are identified by the same symbols while omitting a detailed explanation thereof. Here, note that the steering wheel 1, the auxiliary steering angle superposition mechanism 2, the knuckle arms 4a, 4b, the steerable road wheels 5a, 5b and so on in FIG. 1 are omitted so as to avoid complexities in this figure.

In this case, there is shown an example that uses, as a rotation angle sensor 601, a resolver comprising a rotor 611a for detecting the rotation angle θ of a rotational member, and a stator 611b for detecting the rotation angle θ of the rotor 611a. The rotor 611a of the resolver is mounted on the rotational member that detects an auxiliary steering angle $\theta_M$ to be superposed by the auxiliary steering angle superposition mechanism 2 (see FIG. 1).

In FIG. 9, an ECU 13 is provided with a microcontroller 130 that is connected to the rotor 611a and the stator 611b of the resolver, a steering wheel angle sensor 701, a vehicle travel state sensor 101 and an electric motor 212, and a nonvolatile storage section 14 that is connected to the microcontroller 130.

The microcontroller 130 includes a calculation section of the rotation angle sensor 601, a calculation section (a rotation angle calculation section 602, a multi-revolution counting section 603 and an auxiliary steering angle calculation section 604) of an auxiliary steering angle detection section 6 (see FIG. 1), a calculation section (an interface 702 and a steering wheel angle calculation section 703) of a steering wheel angle detection section 7, an interface 102 of a target auxiliary steering angle calculation section 8, a driving section 9, and an auxiliary steering angle detection abnormality monitoring section 11.

The nonvolatile storage section 14 is connected to the rotation angle calculation section 602 and the multi-revolution counting section 603 in the auxiliary steering angle detection section 6, and stores therein, at the time of termination of the control of the auxiliary steering angle superposition mechanism 2, the detected value of the rotation angle θ from the rotation angle calculation section 602 and the count value of the number of revolutions n per minute from the multi-revolution counting section 603 as a rotation angle storage value and a multi-rotation number storage value, respectively.

In addition, the nonvolatile storage section 14 reads out, at the start of control of the auxiliary steering angle superposition mechanism 2, the multi-rotation number storage value and the rotation angle storage value stored at the control termination time, and inputs them to the multi-revolution counting section 602, thus contributing to the calculation processing of the number of revolutions n per minute immediately after the activation of the auxiliary steering angle superposition mechanism 2. That is, the auxiliary steering angle detection section 6 in the microcontroller 130 stores, at the termination time of the control of the auxiliary steering angle superposition mechanism 2 through the driving section 9, the number of revolutions n per minute counted by the multi-revolution counting section 603 in the nonvolatile storage section 14 as the multi-rotation number storage value, and uses a multi-rotation number storage value as an initial value when the control of the auxiliary steering angle superposition mechanism 2 is restarted or resumed.

Also, the auxiliary steering angle detection section 6 stores, at the termination time of the control of the auxiliary steering angle superposition mechanism 2, the rotation angle θ calculated by the rotation angle calculation section 602 in the nonvolatile storage section 14 as a rotation angle storage value, uses the multi-rotation number storage value as an initial value at the restart of the control of the auxiliary steering angle superposition mechanism 2, and at the same time, performs counting processing upon activation by the multi-revolution counting section 603 based on the rotation angle storage value and the rotation angle θ calculated by the rotation angle calculation section 602.

The rotation angle sensor 601 includes an oscillation section 600, an excitation section 610 that is driven by the oscillation section 600, resolvers 611a, 611b that are connected to the excitation section 610 through output terminals R1, R2, an amplifier section 612 that is connected to the resolvers 611a, 611b through input terminals S1, S2, a sampling section 610 that is connected to the amplifier section 612 and is driven by the oscillation section 600, an AD conversion section 614 that is connected to the sampling section 613, and an amplitude calculation section 615 that outputs a detection signal sin θ based on a digital signal D1 from the AD conversion section 614.

The rotation angle sensor 601 includes an amplifier section 616 that is connected to the resolvers 611a, 611b through input terminals S3, S4, a sampling section 617 that is connected to the amplifier section 616 and is driven by the oscillation section 600, an AD conversion section 618 that is connected to the sampling section 617, and an amplitude calculation section 619 that outputs a detection signal cos θ based on a digital signal D2 from the AD conversion section 618.

The steering wheel angle detection section 7 is provided with a steering wheel angle sensor 701, an interface 702 that takes in a detection signal of the steering wheel angle sensor 701, and a steering wheel angle calculation section 703 that calculates a steering wheel angle $\theta_H$ based on the detection signal of the steering wheel angle sensor 701 through the interface 702.

The vehicle travel state detection section 10 is provided with the vehicle travel state sensor 101 such as a yaw rate sensor, and an interface 102 that inputs a detection signal of the vehicle travel state sensor 101 to the target auxiliary steering angle calculation section 8. In this case, the auxiliary steering angle detection section 6 in the microcontroller 130 performs counting processing of the individual calculation values in the auxiliary steering angle detection section 6 by the multi-revolution counting section 603 upon activation thereof in particular after the lapse of a predetermined time required until the function of the rotation angle sensor 601 becomes stable from the start of operation of the auxiliary steering angle detection section 6 at the restart of the control of the auxiliary steering angle superposition mechanism 2.

Next, reference will be made to the signal processing of the resolvers 611a, 611b in the rotation angle sensor 601 while referring to waveform charts in FIG. 10 through FIG. 12 together with FIG. 9.

In the microcontroller 130 in FIG. 9, first of all, the oscillation section 600 in the rotation angle sensor 601 generates a reference signal for the excitation of the resolvers 611a, 611b. This reference signal is input to the excitation section 610, where it is subjected to waveform shaping processing, power amplification processing and so on, and is then supplied from the output terminals R1, R2 to the stator 611b as an excitation signal R1-R2.

Figure 10:
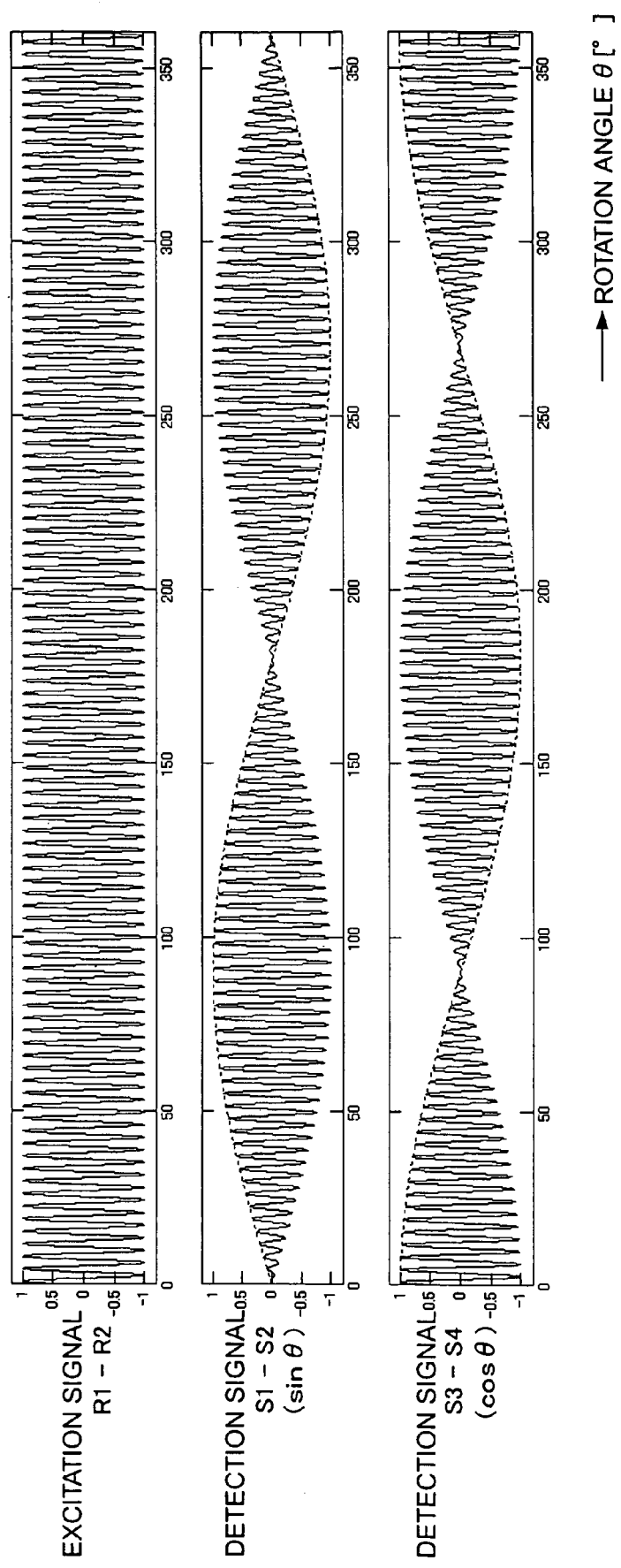
FIG. 10 is a waveform chart showing detection signals in case of using a resolver as an auxiliary steering angle detection section according to the third embodiment of the present invention.

The excitation signal R1-R2 based on the reference signal is shown in the top or uppermost row in FIG. 10. Thus, when the excitation signal R1-R2 is impressed between the output terminals R1, R2 corresponding to the stator 611b of the resolver, detection signals S1-S2, S3-S4, which are amplitude modulated to sin θ, cos θ, respectively, in accordance with the rotation angle θ of the rotor 611a of the resolver, are obtained from the stator 611a through the input terminals S1, S2 and the input terminals S3, S4. The detection signals S1-S2, S3-S4 corresponding to the sin θ, cos θ are shown in the middle row and the bottom or lowermost row in FIG. 10.

In order to obtain the detection signals sin θ, cos θ as described in the above-mentioned first embodiment. from the detection signals S1-S2, S3-S4 thus amplitude modulated, it is necessary to demodulate the detection signals S1-S2, S3-S4. The amplifier sections 612, 616 in the rotation angle sensor 601 convert the detection signals S1-S2, S3-S4 obtained from the stator 611b into voltage values within a voltage range that can be processed by the AD converters 614, 618 in the microcontroller 130, and input them to the sampling sections 613, 617, respectively. The sampling sections 613, 617 sample the output signals of the amplifier sections 612, 616 in synchronization with a reference signal from the oscillation section 600, and input the sampling results to the AD converters 614, 616. The AD converters 614, 616 AD convert the sampling results of the sampling sections 613, 617, and input digital signals D1, D2 thus obtained to the amplitude calculation sections 615, 619. The amplitude calculation sections 615, 619 calculate the amplitudes of the digital signals D1, D2, and input them to the rotation angle calculation section 602 and the auxiliary steering angle detection abnormality monitoring section 11 as the detection signals sin θ, cos θ.

Figure 11:
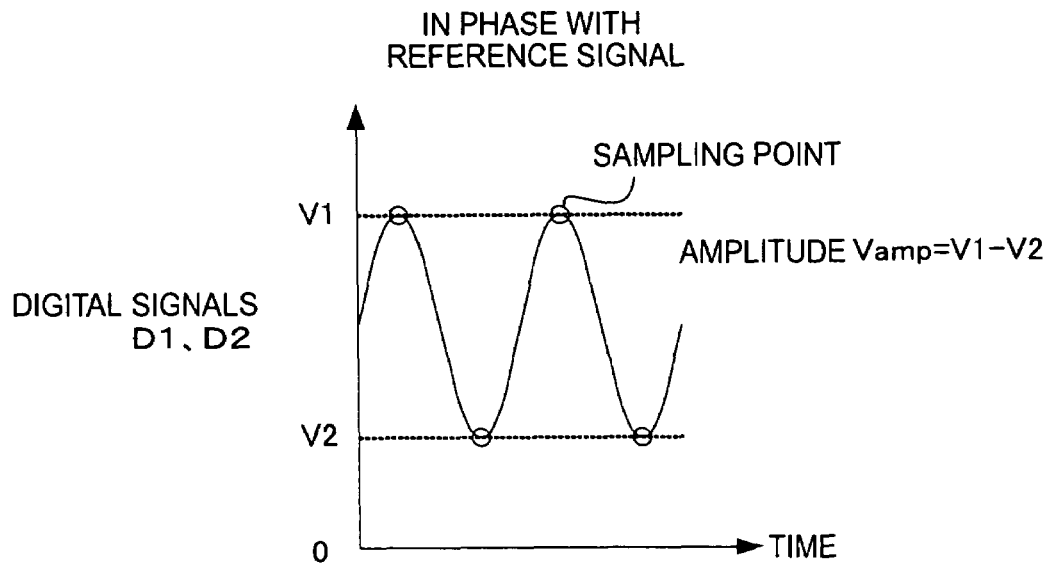
FIG. 11 is a waveform chart for explaining in-phase signal processing of detection signals in case of using a resolver as an auxiliary steering angle detection section according to the third embodiment of the present invention.
Figure 12:
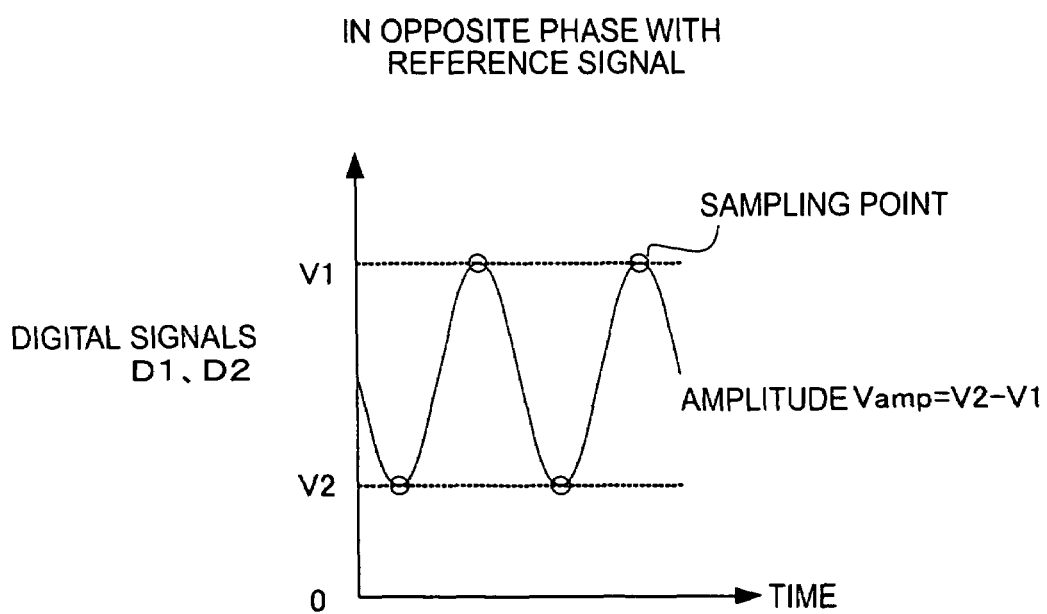
FIG. 12 is a waveform chart for explaining opposite phase signal processing of the detection signals in case of using the resolver as the auxiliary steering angle detection section according to the third embodiment of the present invention.

FIG. 11 and FIG. 12 are waveform charts that show the processing operations of the sampling sections 613, 617, respectively, wherein round marks indicate sampling points. FIG. 11 shows signal processing in case where the waveform of each of the detection signals is in phase with the reference signal from the oscillation section 600, and FIG. 12 shows signal processing in case where the waveform of each of the detection signals is in opposite phase with the reference signal.

As shown by the round marks in FIG. 11 and FIG. 12, in the sampling sections 613, 617, a voltage V1 corresponding to crests of each of the detection signals and a voltage V2 corresponding to troughs of each of the detection signals are sampled in synchronization with the reference signal from the oscillation section 600. If the detection waveform is in phase with the reference signal, the amplitude calculation sections 615, 619 each calculate an amplitude Vamp of a corresponding detection signal as Vamp=V1−V2 based on the sampled individual voltages V1, V2, whereas if the detecting waveform is in opposite phase with the reference signal, the amplitude calculation sections 615, 619 each calculate the amplitude Vamp of the corresponding detection signal as Vamp=V2−V1. The output signals from the amplitude calculation sections 615, 619 are input to the rotation angle calculation section 602 and the auxiliary steering angle detection abnormality monitoring section 11 as the detection signals sin θ, cos θ.

Hereinafter, the rotation angle calculation section 602 calculates the rotation angle θ, which is then program processed in the microcontroller 130 in the ECU 13 according to the above-mentioned arithmetic expression.

Also, in FIG. 9, not only the detection signals sin θ, cos θ but also the digital signals D1, D2 from the AD converters 614, 618 are input to the auxiliary steering angle detection abnormality monitoring section 11.

Hereinafter, reference will be made to the abnormality monitoring processing using the digital signals D1, D2 with reference to a waveform chart in FIG. 13 while omitting the abnormality monitoring processing using the detection signals sin θ, cos θ, which is similar to the above-mentioned one.

Figure 13:
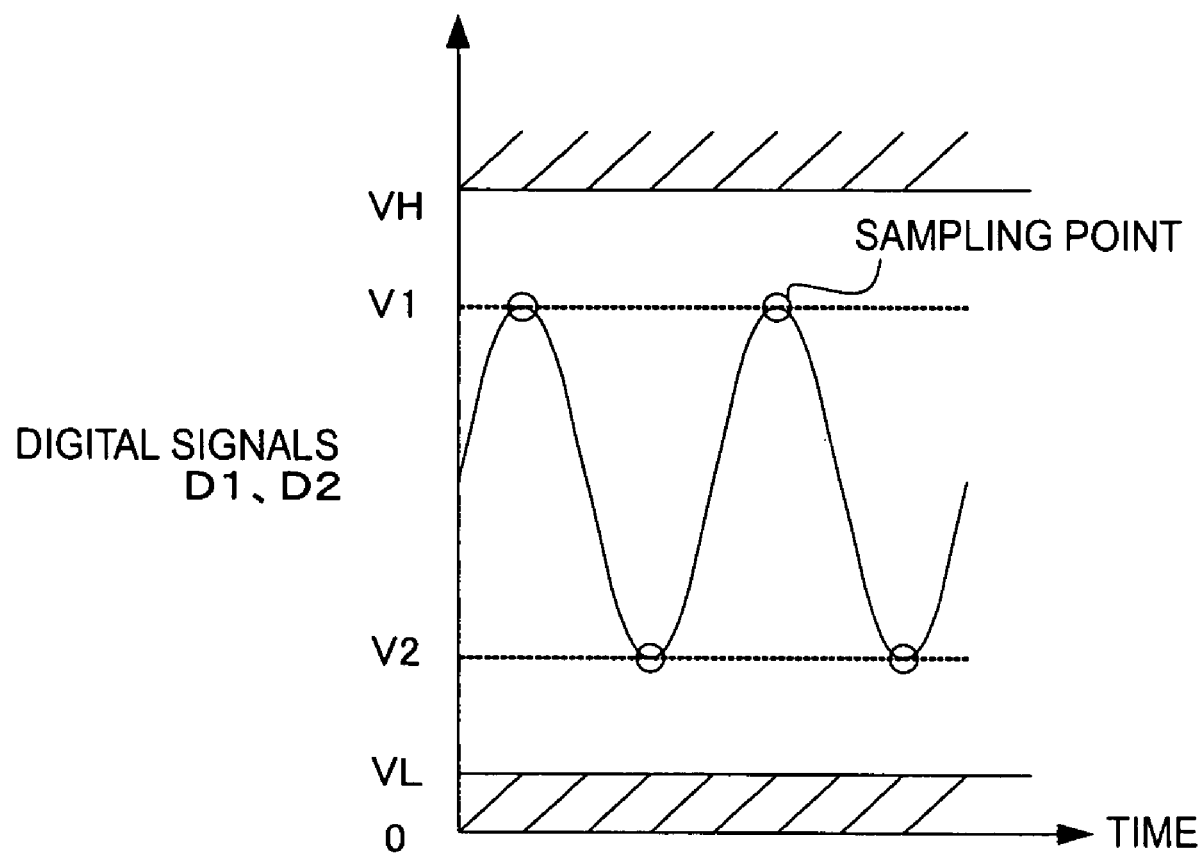
FIG. 13 is a waveform chart for explaining the operation of an auxiliary steering angle detection abnormality monitoring section according to the third embodiment of the present invention.

In FIG. 13, the individual voltages V1, V2 each take a value within a normal output range of VL to VH. That is, the normal output range of VL to VH is set for the digital signals D1, D2 from the amplifier sections 612, 616 in accordance with the characteristics of the resolver 611a, 611b and the characteristics of the amplifier sections 612, 616, as shown in FIG. 13. The auxiliary steering angle detection abnormality monitoring section 11 monitors the voltage values of the digital signals D1, D2, and determines the presence of abnormality therein when either of the digital signals D1, D2 deviates from the output range of VL to VH.

Thus, such an abnormality that either of the digital signals D1, D2 deviates from the normal output range of VL to VH occurs for example when the corresponding amplifier section 612 or 616 fails and changes its output reference level.

Figure 14:
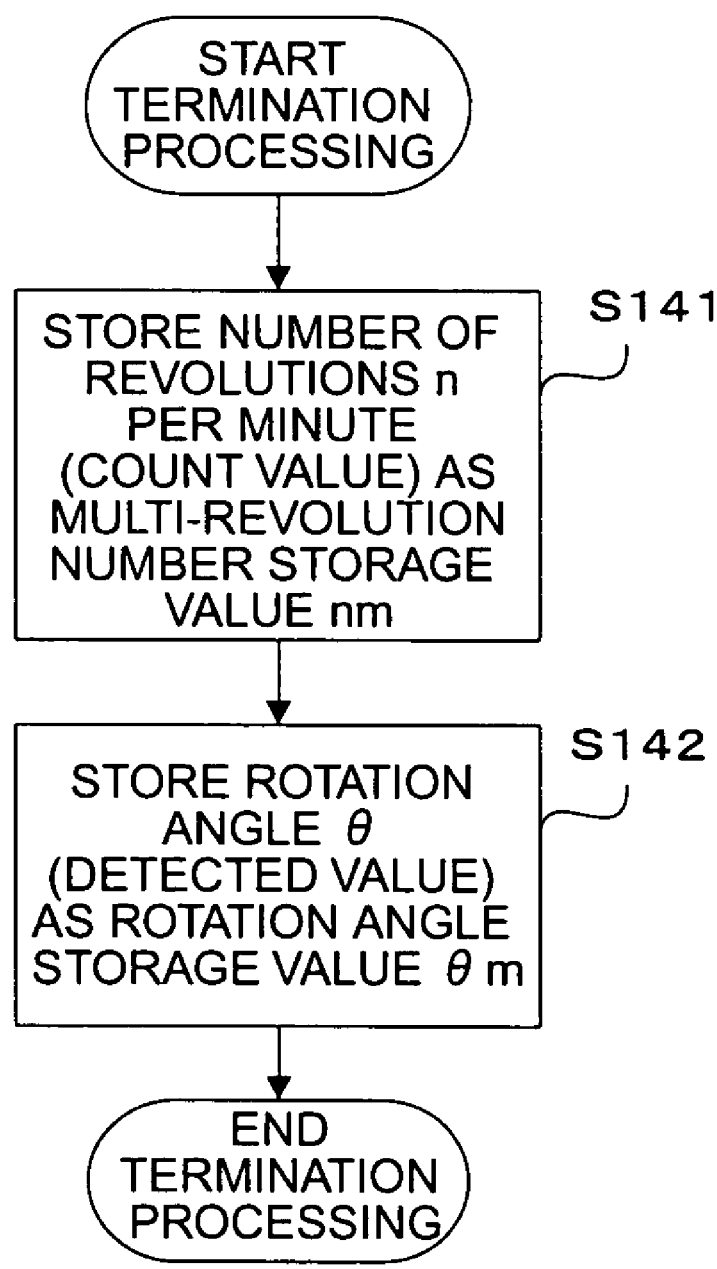
FIG. 14 is a flow chart illustrating termination processing for a multi-revolution count value by a multi-revolution counting section according to the third embodiment of the present invention.
Figure 15:
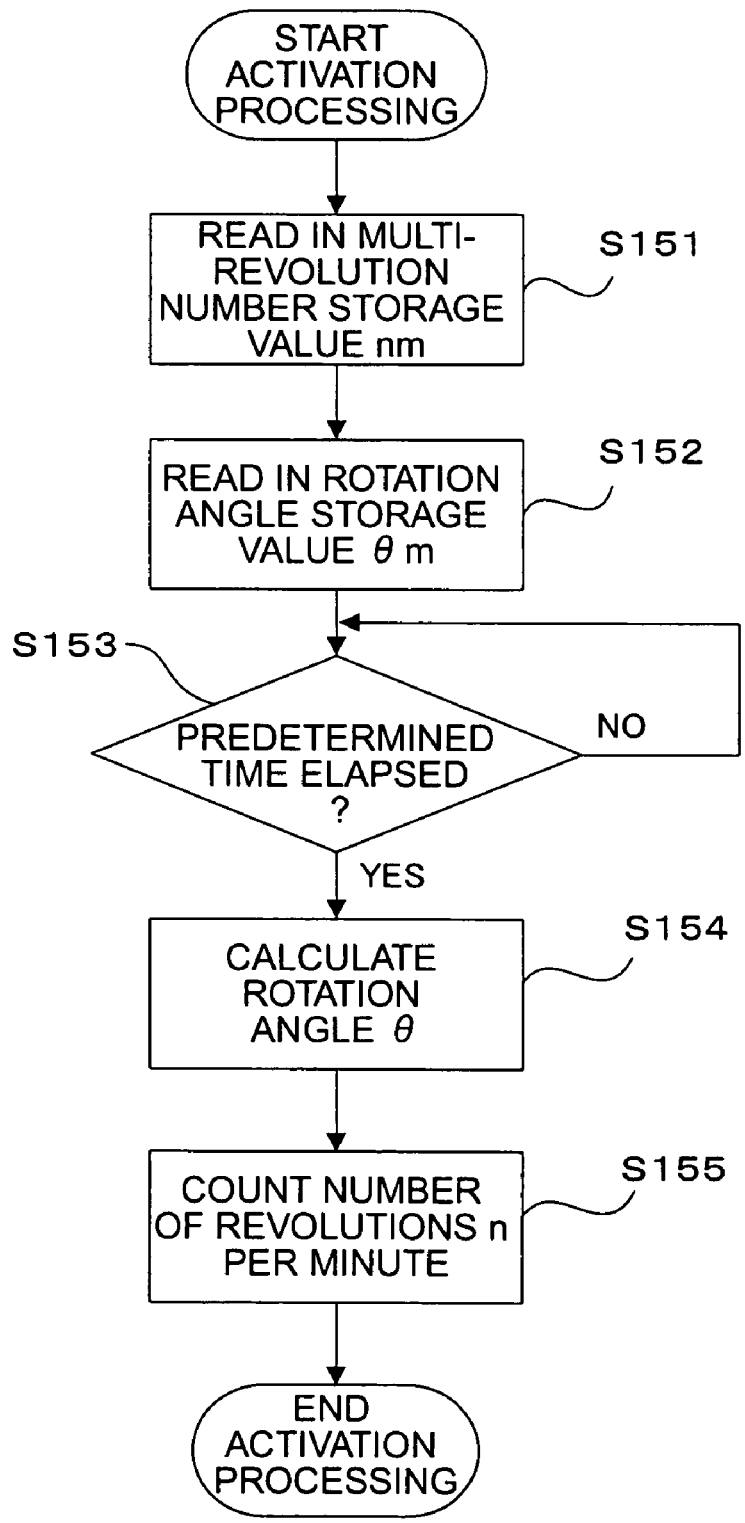
FIG. 15 is a flow chart illustrating start-up or activation processing for the multi-revolution count value by the multi-revolution counting section according to the third embodiment of the present invention.

Next, specific reference will be made to the function of the nonvolatile storage section 14 while referring to flow charts in FIG. 14 and FIG. 15. FIG. 14 shows the control termination processing of the microcontroller 130 using the nonvolatile storage section 14, and FIG. 15 shows the boot or activation processing of the microcontroller 130 using the nonvolatile storage section 14.

The multi-revolution counting section 603 counts the number of revolutions n per minute by processing of the rotation angle θ from the rotation angle calculation section 602 in a time series manner, as previously stated. The counting of the number of revolutions n per minute is program processed in the microcontroller 130, but in the case of not providing the nonvolatile storage section 14, the count value of the number of revolutions n per minute is lost when the power supply of the microcontroller 130 is interrupted upon termination of its control, so the auxiliary steering angle detection section 6 in the microcontroller 130 becomes unable to obtain the accurate auxiliary steering angle $θ_M$ at the restart of the following control.

Accordingly, provision is made for the nonvolatile storage section 14, and the microcontroller 130 executes a processing routine of FIG. 14 upon termination of its control.

In FIG. 14, first of all, the auxiliary steering angle detection section 6 in the microcontroller 130 stores, before the termination of the control of the auxiliary steering angle superposition mechanism 2, the number of revolutions n per minute counted by the multi-revolution counting section 603 in the nonvolatile storage section 14 as a multi-revolution number storage value nm (step S141). Also, the auxiliary steering angle detection section 6 in the microcontroller 130 stores, before the termination of the control of the auxiliary steering angle superposition mechanism 2, the rotation angle θ calculated by the rotation angle calculation section 602 in the nonvolatile storage section 14 as a rotation angle storage value θm (step S142). Thereafter, the power supply of the microcontroller 130 is interrupted to terminate the processing routine of FIG. 14.

On the other hand, the microcontroller 130 executes a processing routine in FIG. 15 upon activation thereof. In FIG. 15, first of all, the auxiliary steering angle detection section 6 in the microcontroller 130 reads in the multi-revolution number storage value nm stored in the nonvolatile storage section 14 (step S151), and then reads in the rotation angle storage value θm stored in the nonvolatile storage section 14 (step S151).

Next, by measuring the time elapsed after the start of activation of the auxiliary steering angle detection section 6, it is determined whether a predetermined time has elapsed (step S153), and when it is determined that the predetermined time has not yet elapsed (that is, NO), the determination processing in step S153 is repeated, whereas when it is determined in step S153 that the predetermined time has elapsed (that is, YES), the control flow proceeds to the following step S154.

Here, the reason why the lapse of the predetermined time is waited for will be described below. As described above (see FIG. 9), the resolver in the rotation angle sensor 601 is constructed such that an excitation signal is impressed on an excitation winding (corresponding to the output terminals R1, R2) of the stator 611b, and the detection signals S1-S2, S3-S4 are extracted from the detection winding (corresponding to the input terminals S1, S2 and the input terminal S3, S4) of the stator 611b in accordance with the rotation angle of the rotor 611a.

Accordingly, even if the excitation of the resolver is started by an excitation signal from the excitation section 610 at the time of activation of the microcontroller 130, it is necessary to wait for the lapse of the predetermined time until the correct detection signals S1-S2, S3-S4 are obtained. At this time, if the rotation angle detection processing according to the rotation angle sensor 601 is performed within a period from the start of activation of the microcontroller 130 until the time at which the correct detection signals S1-S2, S3-S4 are obtained, the rotation angle θ calculated by the rotation angle calculation section 602 becomes an indefinite or variable value that changes in accordance with the rising characteristics of the detection signals S1-S2, S3-S4. Thus, there is the possibility of counting an incorrect number of revolutions n per minute when the number of revolutions n per minute is counted by the multi-revolution counting section 603 by the use of the indefinite or variable rotation angle θ in this manner. Accordingly, such incorrect multi-revolution processing can be prevented by inhibiting actual control processing over the predetermined time until the time when the correct detection signals S1-S2, S3-S4 are obtained from the resolver, as shown in step S153 in FIG. 15.

Hereinafter, the rotation angle θ first time after the activation of the microcontroller 130 is detected after the lapse of the predetermined time therefrom (step S154).

Subsequently, the multi-revolution number storage value nm at the last control termination time read in step S151 is set as an initial value, and then calculation processing for the number of revolutions n per minute is executed based on the rotation angle storage value θm at the last control termination time read in step S152 and the first rotation angle θ detected in step S154 (step S155).

In case where the rotation angle storage value θm at the termination of control of the electric motor 212 is an angle at which the number of revolutions n per minute is counted (i.e., in the vicinity of 0 degrees or 360 degrees), even if a transition from 0 degrees to 360 degrees or a transition from 360 degrees to 0 degrees is caused between the rotation angle storage value θm at the time of control termination and the rotation angle θ at the time of activation by the influence of a mechanical play of the auxiliary steering angle superposition mechanism 2, the accuracy of the detection signals sin θ, cos θ of the rotation angle sensor 601, the accuracies of other detection sections, or the like, the difference therebetween can be minimized by executing calculation processing for the number of revolutions n per minute in this manner, whereby the auxiliary steering angle $θ_M$ can be accurately detected from the time of activation of the microcontroller 130.

For example, in case where a transition from 360 degrees to 0 degrees is caused within a period from the time of the last control termination until the time of the current activation, with the rotation angle storage value θm being 359 degrees (i.e., θm=359 degrees) and the rotation angle θ at the time of activation being 1 degrees (i.e., θ=1 degrees), calculation processing for the number of revolutions n per minute is executed, and the multi-revolution number storage value (count value) nm read out from the nonvolatile storage section 14 is incremented by 1 to "nm+1".

As a result, the rotation angle θ1 at the termination of the last control added by the number of revolutions n per minute and the rotation angle θ2 at the time of the current activation are represented by the following expressions (13) and (14), respectively.

$$\theta 1 = n \times 360° + 359° \quad (13)$$

$$\theta 2 = (n+1) \times 360° + 1° \quad (14)$$

As is clear from the above expressions (13) and (14), the difference between θ2 and θ1 (=θ 2−θ1) is "2 degrees". On the other hand, in case where a transition from 0 degrees to 360 degrees is caused within a period from the time of the last control termination until the time of the current activation, with the rotation angle storage value θm being 1 degrees (i.e., θm=1 degrees) and the rotation angle θ at the time of activation being 359 degrees (i.e., θ=359 degrees), calculation processing for the number of revolutions n per minute is executed to increment the multi-revolution number storage value (count value) nm read out from the nonvolatile storage section 14 by 1 to "nm−1".

As a result, the rotation angle θ 1 at the termination of the last control added by the number of revolutions n per minute and the rotation angle θ 2 at the time of the current activation are represented by the following expressions (15) and (16), respectively.

$$\theta 1 = n \times 360° + 1° \quad (15)$$

$$\theta 2 = (n-1) \times 360° + 359° \quad (16)$$

As is clear from the above expressions (15) and (16), the difference between θ 2 and θ 1 (=θ2−θ1) is also "2 degrees". If the multi-revolution number storage value nm read out from the nonvolatile storage section. 14 is used for control upon activation as it is without executing calculation processing for the number of revolutions n per minute (i.e., without using the above expression (14)) upon occurrence of a transition from 360 degrees to 0 degrees, the number of revolutions per minute (count value) n will deviate by about one revolution.

In this case, the rotation angle θ 1 at the termination of the last control added by the number of revolutions n per minute and the rotation angle θ2 at the time of the current activation are represented by the following expressions (17) and (18), respectively.

$$\theta 1 = n \times 360° + 359° \quad (17)$$

$$\theta 2 = n \times 360° + 1° \quad (18)$$

Here, note that the above expression (17) is similar to the above expression (13).

As is clear from the above expressions (17) and (18), the rotational member, though not actually moved at all, is assumed to have rotated an angle of 358 degrees (about one revolution), and hence the control at the time of activation is impaired.

Here, note that the nonvolatile storage section 14 can be achieved by using an electrically erasable and rewritable EEPROM, an electrically erasable and rewritable flash ROM in the microcontroller 130, etc.

In addition, although it is constructed such that the lapse of the predetermined time is waited for in step S153 in FIG. 15, activation of the rotation angle sensor 601 may instead be verified based on the time series change of the detection signals sin θ and cos θ of the rotation angle sensor 601.

Further, the electric motor 212 in the auxiliary steering angle superposition mechanism 2 may be composed of a brushed DC motor. In this case, the auxiliary steering angle superposition mechanism 2 is driven by the brushed DC motor. Conventionally, as disclosed in the above-mentioned first patent document for example, a brushless motor is adopted for the driving of the auxiliary steering angle superposition mechanism 2, and a motor angle sensor necessary for the driving of the brushless motor is used as an auxiliary steering angle sensor. That is, it is considered that the steering of the steerable road wheels 5a, 5b, unintended by the driver, due to the failure of the auxiliary steering angle sensor (the motor angle sensor) is prevented by the inability of the brushless motor to rotate resulting from the failure of the motor angle sensor.

As described above, however, the vehicular steering system according to the present invention is constructed to be able to detect the failure of the rotation angle sensor 601 in an easy and independent manner, so even with the use of the brushed DC motor as the electric motor 212, it is possible to prevent the steering of the steerable road wheels 5a, 5b not intended by the driver.

In addition, the electric motor 212 in the form of a brushed DC motor and the rotation angle sensor 601 may be formed integrally with each other, with the rotation angle sensor 601 being built into the auxiliary steering angle superposition mechanism 2.

Moreover, the rotation angle sensor 601 is formed of a rotor that is mounted on a motor shaft of the brushed DC motor, and a stator for detecting the rotation angle of the rotor. Further, the stator of the rotation angle sensor 601 is fixed to a housing of the brushed DC motor.

As described above, according to the third embodiment of the present invention, at the termination of the control of the auxiliary steering angle superposition mechanism 2, the count value (the number of revolutions n per minute) of the multi-revolution counting section 603 is stored in the nonvolatile storage section 14, and at the restart of the control of the auxiliary steering angle superposition mechanism 2, the multi-revolution number storage value nm stored in the nonvolatile storage section 14 is used as an initial value. As a result, it is possible to accurately detect the auxiliary steering angle $\theta_M$ from the time of activation of the microcontroller 130.

Also, at the termination of the control of the auxiliary steering angle superposition mechanism 2, the detected value (rotation angle θ) of the rotation angle calculation section 602 is stored in the nonvolatile storage section 14, and at the restart of the control of the auxiliary steering angle superposition mechanism 2, by using the multi-revolution number storage value nm stored in the nonvolatile storage section 14 as an initial value, activation time multi-revolution counting processing is executed by means of the multi-revolution counting section 603 based on the rotation angle storage value θm stored in the nonvolatile storage section 14 and the detected value (rotation angle θ) of the rotation angle calculation section 602 at the restart of the control. Accordingly, the auxiliary steering angle $\theta_M$ can be accurately detected at the start of the control without regard to the superposed angle of the auxiliary steering angle at the termination of the control.

In addition, at the restart of the control, the activation time multi-revolution counting processing is executed by the multi-revolution counting section 603 after the lapse of the predetermined time required until the detected value of the rotation angle θ becomes stable from the start of operation of the auxiliary steering angle detection section 6. As a result, it is possible to prevent mis-counting of the number of revolutions n per minute by the auxiliary steering angle detection section 6 at the time of activation thereof, and hence to accurately detect the auxiliary steering angle $\theta_M$ from the start of the control.

Moreover, the electrically controllable auxiliary steering angle superposition mechanism 2 is constructed so as to be driven by the brushed DC motor. With such a construction, it is possible to reduce, in comparison with the case where the auxiliary steering angle superposition mechanism 2 is constructed to be driven by a brushless DC motor, the number of electronic parts required for driving the auxiliary steering angle superposition mechanism 2 and the area of a substrate board required for mounting the electronic parts, so the system can be constructed at a further reduced cost because of the low cost of the brushed motor itself.

Further, the rotation angle sensor 601 of the auxiliary steering detection section 6 is formed of the rotor mounted on the motor shaft of the brushed DC motor and the stator for detecting the rotation angle of the rotor, and the stator is fixedly attached to the housing of the brushed DC motor. With such an arrangement, the brushed DC motor (electric motor 212) and the rotation angle sensor 601 can be formed integrally with each other, and hence the number of component elements to be assembled to the auxiliary steering angle superposition mechanism 2 can be decreased, thus making it possible to construct the system at a low cost.

While the invention has been described in terms of preferred embodiments, those skilled in the art will recognize that the invention can be practiced with modifications within the spirit and scope of the appended claims.

What is claimed is:

1. A method of detecting the presence or absence of an abnormality using a vehicular steering system having a steering mechanism for steering steerable road wheels of a vehicle in accordance with a steering wheel to be steered by a driver of said vehicle and an auxiliary steering angle superposition mechanism with an electrically controllable rotational member, said method comprising:

detecting a steering angle of said steering wheel operated by said driver as a steering wheel angle;

detecting an auxiliary steering angle to be superposed by said auxiliary steering angle superposition mechanism using an auxiliary steering angle detection section;

detecting the traveling state of said vehicle;

setting a transmission characteristic between said detected steering wheel angle and said detected steered angle of said steerable road wheels in accordance with the traveling state of said vehicle;

calculating a target auxiliary steering angle to be superposed by said auxiliary steering angle superposition mechanism in accordance with said transmission characteristic;

driving said auxiliary steering angle superposition mechanism so as to make said auxiliary steering angle detected by said auxiliary steering angle detection section coincide with said target auxiliary steering angle; and detecting the presence or absence of abnormality of said auxiliary steering angle detection section;

wherein said auxiliary steering angle detection section includes:

a rotation angle sensor that outputs sin θ and cos θ corresponding to a rotation angle of said rotational member as detection signals;

a rotation angle calculation section that calculates the rotation angle of said rotational member based on said detection signals;

a multi-revolution counting section that counts the number of revolutions of said rotational member based on said rotation angle; and an auxiliary steering angle calculation section that calculates said auxiliary steering angle based on said rotation angle and said number of revolutions;

wherein the presence or absence of abnormality of said auxiliary steering angle detection section is detected by monitoring said detection signals.

2. The method as set forth in claim 1, wherein when abnormality is detected, the driving of said auxiliary steering angle superposition mechanism is stopped.

3. The method as set forth in claim 1, wherein said auxiliary steering angle detection section further includes a rotation angle estimation section that calculates an estimated rotation angle based on only one of said sin θ and said cos θ;

when abnormality of only one of said sin θ and said cos θ is detected said estimated rotation angle is calculated based on the other normal detection signal of said sin θ and said cos θ; and said auxiliary steering angle superposition mechanism is driven so as to make said auxiliary steering angle based on said estimated rotation angle coincide with said target auxiliary steering angle.

4. The method as set forth in claim 1, further comprising:

detecting a straight-ahead driving state of said vehicle based on the traveling state of said vehicle and said steering wheel angle;

wherein, upon detection of the straight-ahead driving state of said vehicle, the driving of said auxiliary steering angle superposition mechanism by said driving control section is stopped.

5. The method as set forth in claim 1, wherein:

a nonvolatile storage section is connected to said auxiliary steering angle detection section; and said auxiliary steering angle detection section stores said number of revolutions counted by said multi-revolution counting section in said nonvolatile storage as a multi-revolution number storage value at the termination of the control of said auxiliary steering angle superposition mechanism through said driving control section, and uses said multi-revolution number storage value as an initial value at the restart of the control of said auxiliary steering angle superposition mechanism.

6. The method as set forth in claim 5, wherein said auxiliary steering angle detection section stores said rotation angle calculated by said rotation angle calculation section in said nonvolatile storage section as a rotation angle storage value at the termination of the control of said auxiliary steering angle superposition mechanism, and performs activation time calculation processing by said multi-revolution counting section based on said rotation angle storage value and said rotation angle calculated by said rotation angle calculation section at the restart of the control of said auxiliary steering angle superposition mechanism.

7. The method as set forth in claim 5, wherein said auxiliary steering angle detection section performs the calculation processing by said multi-revolution counting section after the lapse of a predetermined time required from the start of operation of said auxiliary steering angle detection section until the time at which individual calculation values in said auxiliary steering angle detection section become stable at the restart of the control of said auxiliary steering angle superposition mechanism.

8. The method as set forth in claim 1, wherein said auxiliary steering angle superposition mechanism is driven by a brushed DC motor.

9. The method as set forth in claim 8, wherein said rotation angle sensor includes:

a rotor that is mounted on a motor shaft of said brushed DC motor; and a stator that detects a rotation angle of said rotor;

wherein said stator is fixedly attached to a housing of said brushed DC motor.

* * * * *